United States Patent
Dennis et al.

(10) Patent No.: US 10,455,419 B2
(45) Date of Patent: *Oct. 22, 2019

(54) SYSTEM AND METHOD FOR MOBILE IDENTITY PROTECTION FOR ONLINE USER AUTHENTICATION

(71) Applicant: Visa International Service Association, San Francisco, CA (US)

(72) Inventors: Charles L. Dennis, Issaquah, WA (US); Randall A. Snyder, Las Vegas, NV (US); Michael F. Buhrmann, North Bend, WA (US); Patrick J. Boyle, Seattle, WA (US)

(73) Assignee: Visa International Service Association, San Francisco, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 15/621,186

(22) Filed: Jun. 13, 2017

(65) Prior Publication Data

US 2017/0280323 A1    Sep. 28, 2017

Related U.S. Application Data

(63) Continuation of application No. 14/922,727, filed on Oct. 26, 2015, now Pat. No. 9,838,872, which is a
(Continued)

(51) Int. Cl.
*H04L 29/06* (2006.01)
*H04W 12/06* (2009.01)
(Continued)

(52) U.S. Cl.
CPC ............ *H04W 12/06* (2013.01); *G06F 21/35* (2013.01); *G06Q 20/108* (2013.01); *G06Q 20/32* (2013.01);
(Continued)

(58) Field of Classification Search
CPC ............. H04L 63/1416; H04L 63/0876; H04L 63/0853; G06F 21/35; G06Q 20/108;
(Continued)

(56) References Cited

U.S. PATENT DOCUMENTS 7,171,460 B2 * 1/2007 Kalavade ............... G06Q 20/14
709/223
7,509,131 B2 * 3/2009 Krumm .............. H04N 21/4126
455/456.1

(Continued)

Primary Examiner — Mohammad A Siddiqi
(74) Attorney, Agent, or Firm — Kilpatrick Townsend & Stockton LLP

(57) ABSTRACT

An automated system and method for authenticating entities or individuals attempting to access a computer application, network, system or device using a wireless device is provided. The system employs one or more short-range wireless interfaces (e.g. BLUETOOTH or Wi-Fi) or long-range wireless interfaces (e.g. cellular or WiMAX) to detect the presence or location of the wireless device and it's proximity to the secure system to be accessed. The wireless device incorporates a unique identifier and secure authentication key information associated with the user of the wireless device. An authentication result is generated and may be used for a variety of applications. The application may process the result and determine the degree of access for which the entity or individual is allowed.

20 Claims, 11 Drawing Sheets

Related U.S. Application Data continuation of application No. 12/343,015, filed on Dec. 23, 2008, now Pat. No. 9,185,123, said application No. 14/922,727 is a continuation-in-part of application No. 14/867,382, filed on Sep. 28, 2015, now Pat. No. 9,456,348, which is a continuation of application No. 14/457,740, filed on Aug. 12, 2014, now Pat. No. 9,154,952, which is a continuation of application No. 12/992,064, filed as application No. PCT/US2010/003007 on May 13, 2009, now Pat. No. 8,839,394, said application No. 14/922,727 is a continuation-in-part of application No. 14/054,047, filed on Oct. 15, 2013, now abandoned, which is a continuation of application No. 13/303,809, filed on Nov. 23, 2011, now Pat. No. 8,588,748, which is a continuation of application No. 12/332,878, filed on Dec. 11, 2008, now Pat. No. 8,116,731, said application No. 14/922,727 is a continuation-in-part of application No. 14/196,861, filed on Mar. 4, 2014, now Pat. No. 9,432,845, which is a continuation of application No. 11/933,803, filed on Nov. 1, 2007, now Pat. No. 8,374,634, said application No. 14/922,727 is a continuation-in-part of application No. 13/030,759, filed on Feb. 18, 2011, now abandoned, said application No. 14/922,727 is a continuation-in-part of application No. 13/030,794, filed on Feb. 18, 2011, now abandoned, said application No. 14/922,727 is a continuation-in-part of application No. 13/382,900, filed as application No. PCT/US2010/041264 on Jul. 7, 2010, now abandoned, said application No. 14/922,727 is a continuation-in-part of application No. 13/387,991, filed as application No. PCT/US2010/044019 on Jul. 30, 2010, now Pat. No. 9,818,121, said application No. 14/922,727 is a continuation-in-part of application No. 13/752,271, filed on Jan. 28, 2013, said application No. 14/922,727 is a continuation-in-part of application No. 13/903,663, filed on May 28, 2013, now Pat. No. 9,922,323.

(60) Provisional application No. 61/027,892, filed on Feb. 12, 2008, provisional application No. 61/053,152, filed on May 14, 2008, provisional application No. 61/058,621, filed on Jun. 4, 2008, provisional application No. 61/027,892, filed on Feb. 12, 2008, provisional application No. 60/979,663, filed on Oct. 12, 2007, provisional application No. 60/909,718, filed on Apr. 3, 2007, provisional application No. 60/895,144, filed on Mar. 16, 2007, provisional application No. 61/305,830, filed on Feb. 18, 2010, provisional application No. 61/306,369, filed on Feb. 19, 2010, provisional application No. 61/223,671, filed on Jul. 7, 2009, provisional application No. 61/223,677, filed on Jul. 7, 2009, provisional application No. 61/230,628, filed on Jul. 31, 2009, provisional application No. 61/591,232, filed on Jan. 26, 2012, provisional application No. 61/659,934, filed on Jun. 14, 2012, provisional application No. 61/652,173, filed on May 26, 2012.

(51) Int. Cl.
| | |
|---|---|
| *H04W 12/12* | (2009.01) |
| *H04W 12/08* | (2009.01) |
| *G06F 21/35* | (2013.01) |
| *G06Q 20/10* | (2012.01) |
| *G06Q 20/32* | (2012.01) |
| *H04W 84/00* | (2009.01) |

(52) U.S. Cl.
CPC .......... *H04L 63/08* (2013.01); *H04L 63/0876* (2013.01); *H04L 63/10* (2013.01); *H04L 63/1416* (2013.01); *H04W 12/08* (2013.01); *H04W 12/12* (2013.01); *H04W 12/1206* (2019.01); *H04L 63/0853* (2013.01); *H04W 84/005* (2013.01)

(58) Field of Classification Search
CPC ...... G06Q 20/32; H04W 12/12; H04W 12/06; H04W 84/005
See application file for complete search history.

(56) References Cited

U.S. PATENT DOCUMENTS

| | | | |
|---|---|---|---|
| 8,559,884 B2* | 10/2013 | Dolfini | H04W 4/02 455/41.1 |
| 8,768,322 B2* | 7/2014 | Jones | H04W 48/16 455/418 |
| 9,838,872 B2* | 12/2017 | Dennis | H04L 63/1416 |
| 2005/0239445 A1* | 10/2005 | Karaoguz | H04L 12/2803 455/414.1 |

* cited by examiner

340

| Wireless Device ID (MDN) | Authentication Key Information | Location of the Application Access Event | Date: Time | Authentication Results |
|---|---|---|---|---|
| +1-702-555-0000 | 1446743349 | Geographic Name, ID, Address or Coordinates | 09:26:2007: 12:34:56 | Application ID Results |
| +1-702-555-1234 | 3522921399 | Geographic Name, ID, Address or Coordinates | 09:24:2007: 22:45:07 | Application ID Results |
| +1-206-555-1111 | 8884326790 | Geographic Name, ID, Address or Coordinates | 09:21:2007: 13:12:45 | Application ID Results |
| +1-425-555-1234 | 1157320965 | Geographic Name, ID, Address or Coordinates | 09:29:2007: 19:22:23 | Application ID Results |
| ⋮ | ⋮ | ⋮ | ⋮ | ⋮ |

341, 342, 343, 344, 345, 346

EXEMPLARY WIRELESS DEVICE ID DATABASE

FIG. 7

SYSTEM AND METHOD FOR MOBILE IDENTITY PROTECTION FOR ONLINE USER AUTHENTICATION

CROSS REFERENCE TO RELATED APPLICATIONS AND PATENTS

This application is a continuation of U.S. patent application Ser. No. 14/922,727 filed Oct. 26, 2015, which is a continuation of U.S. patent application Ser. No. 12/343,015 filed Dec. 23, 2008 now U.S. Pat. No. 9,185,123, which claims the benefit of U.S. Provisional Application Ser. No. 61/027,892 filed Feb. 12, 2008. U.S. patent application Ser. No. 14/922,727 is a continuation-in-part of and claims the benefit of the filing date of U.S. patent application Ser. No. 14/867,382 filed on Sep. 28, 2015 now U.S. Pat. No. 9,456,348 which is a continuation of U.S. patent application Ser. No. 14/457,740 filed on Aug. 12, 2014 now U.S. Pat. No. 9,154,952 issued Oct. 6, 2015 which is a continuation of U.S. patent application Ser. No. 12/992,064 filed on Feb. 9, 2011, now U.S. Pat. No. 8,839,394 issued on Sep. 16, 2014, which is a 371 National Stage entry of Patent Cooperation Treaty application No. PCT/US2009/03007 filed on May 13, 2009 which claims the benefit of U.S. Provisional Application Ser. No. 61/053,152 filed May 14, 2008 each of which is incorporated herein by reference in its entirety. U.S. patent application Ser. No. 14/922,727 is a continuation-in-part, and claims the benefit of the filing date, of U.S. patent application Ser. No. 14/054,047 filed on Oct. 15, 2013 which is a continuation of U.S. patent application Ser. No. 13/303,809 filed on Nov. 23, 2011 now U.S. Pat. No. 8,588,748 issued on Nov. 19, 2013 which is a continuation of U.S. patent application Ser. No. 12/332,878, filed Dec. 11, 2008, now U.S. Pat. No. 8,116,731 issued on Feb. 14, 2012 which claims the benefit of U.S. Provisional Application No. 61/058,621, filed Jun. 4, 2008, and also claims the benefit of U.S. Provisional Application No. 61/027,892, filed Feb. 12, 2008. U.S. patent application Ser. No. 14/922,727 is a continuation-in-part, and claims the benefit of the filing date, of U.S. patent application Ser. No. 14/196,861 filed on Mar. 4, 2014 now U.S. Pat. No. 9,432,845 which is a continuation of U.S. application Ser. No. 11/933,803, filed Nov. 1, 2007, now U.S. Pat. No. 8,374,634 issued on Feb. 12, 2013 which claims the benefit of U.S. Provisional Application No. 60/979,663, filed Oct. 12, 2007; U.S. Provisional Application No. 60/909,718, filed Apr. 3, 2007; and U.S. Provisional Application Ser. No. 60/895,144, filed Mar. 16, 2007. U.S. patent application Ser. No. 14/922,727 is a continuation-in-part, and claims the benefit of the filing date, of U.S. patent application Ser. No. 13/030,759 filed on Feb. 18, 2011, which claims the benefit of U.S. Provisional Application No. 61/305,830, filed Feb. 18, 2010. U.S. patent application Ser. No. 14/922,727 is a continuation-in-part, and claims the benefit of the filing date, of U.S. patent application Ser. No. 13/030,794 filed on Feb. 18, 2011, which claims the benefit of U.S. Provisional Application No. 61/306,369, filed Feb. 19, 2010. U.S. patent application Ser. No. 14/922,727 is a continuation-in-part, and claims the benefit of the filing dates of U.S. patent application Ser. No. 13/382,900 filed on Feb. 13, 2012, which is a 371 National Stage entry of Patent Cooperation Treaty application No. PCT/US2010/41264 filed on Jul. 7, 2010 which claims the benefit of U.S. Provisional Application No. 61/223,671, filed Jul. 7, 2009 and U.S. Provisional Application No. 61/223,677, filed Jul. 7, 2009. U.S. patent application Ser. No. 14/922,727 is a continuation-in-part, and claims the benefit of the filing date, of U.S. patent application Ser. No. 13/387,991 filed on Jan. 30, 2012, which is a 371 National Stage entry of Patent Cooperation Treaty application No. PCT/US2010/44019 filed on Jul. 30, 2010 which claims the benefit of U.S. Provisional Application No. 61/230,628, filed Jul. 31, 2009. U.S. patent application Ser. No. 14/922,727 is a continuation-in-part, and claims the benefit of the filing date, of U.S. patent application Ser. No. 13/752,271 filed on Jan. 28, 2013, which claims the benefit of U.S. Provisional Application No. 61/591,232, filed Jan. 26, 2012. U.S. patent application Ser. No. 14/922,727 is a continuation-in-part, and claims the benefit of the filing date, of U.S. patent application Ser. No. 13/903,663 filed on May 28, 2013, which claims the benefit of U.S. Provisional Application No. 61/659,934, filed Jun. 14, 2012 and U.S. Provisional Application No. 61/652,173, filed May 26, 2012. The contents of each of the foregoing applications are herein incorporated by reference in their entirety for all purposes.

The contents of each of the foregoing applications are incorporated herein by reference in their entirety.

BACKGROUND OF THE INVENTION

1. Technical Field of the Invention

This invention relates generally to the detection and prevention of identity theft based on fraudulent access to, or fraudulent use of, computer applications, networks, systems and devices, and more particularly to an automated system and method that uses a wireless device to authenticate the identity of the wireless device's user via a local or networked wireless connection when accessing secure computer applications, networks, systems and devices.

2. Description of the Related Art

In the following discussion, the term "entity" is used for illustrative purposes. In general, entities requiring authentication are individuals, data subjects or any electronic or computing devices that may be a subject whose identity requires some form of identity authentication.

Accurate authentication of the identity of users or entities accessing secure computer applications, networks, system and devices or otherwise engaging in secure transactions or activities is a problem that continues to grow. Many solutions have been introduced to detect or prevent unauthorized access to secure computer applications, hardware and software systems that attempt to determine through various means if an entity attempting to access a computer or application is the lawful and rightful user. Also, an increasing number of people rely on secure website applications to carry out their daily business. People conduct both their personal and job-related business using these secure applications. A growing number of people have given up conventional banking in favor of on-line banking to conduct a variety of secure transactions. Many consumers purchase goods and services on-line using sensitive credit card and related information. Even the purchase, sale and management of stocks and securities on-line via stock broker websites have become commonplace. Secure websites have become an integral part of our daily life, and due to the sensitive nature of the transactions and activities performed using these website applications, security is a primary concern. Financial websites are especially concerned with security and are continually adding requirements to reduce incidents of identity theft, as are electronic commerce (e-commerce) website applications. Additionally, there are a variety of on-line non-financial website applications requiring security, such as social networking sites, airline reservation sites, travel sites, media sites, sites where software may be downloaded, secure Internet portals, email sites and the like.

Many of the solutions employed by organizations to provide factual identity authentication for individuals attempting to access their secure websites and other computer applications are based on an authentication factor. Authentication factors are pieces of information used to authenticate or verify a person's identity on appearance or in a procedure for security purposes and with respect to individually granted access rights. Among the most well-known authentication factors are usernames and passwords that are required for access to a particular application. These authentication factors are typically known categorically as knowledge factors. That is, knowledge factors provide a form of authentication based on what an individual knows. Another example of a knowledge factor is a personal identity number or PIN, that is commonly used when individuals access an automatic teller machine (ATM). Other categories of authentication factors are ownership factors and inherence factors. Ownership factors are based on something an individual has, such as a wrist-band or a government-issued identification card. Inherence factors are based on something the individual is or does, such as fingerprint scans, retinal scans and other biometric forms of authentication.

Many highly secure websites and computer applications require more than one type of authentication factor for access. It has become widespread, especially for on-line banking applications, for individuals to apply knowledge factors as well as ownership factors to gain access to the on-line banking application. The ownership factors most commonly used are in the form of security tokens provided to, and maintained by, the individual users themselves.

A security token, also known as a hardware token, authentication token, cryptographic token, or key-fob, may be a physical device that an authorized user of computer applications or services is given to aid with the identity authentication process. The term security token may also refer to software tokens. Security tokens are used to prove one's identity electronically, as in the case of a customer trying to access their on-line bank account. The token is used in addition to, or in place of, a password to prove that the user is who they claim to be. The token acts like an electronic key to access something.

Hardware tokens are typically small enough to be carried in a pocket or purse and often are designed to attach to the user's keychain. Some may store cryptographic keys, such as an electronic digital signature. Some designs feature tamper resistant packaging, while others may include small keypads to allow entry of a PIN or a simple button to start a routine with some display capability to show a generated key number. Some hardware token designs incorporate a universal serial bus (USB) connector, radio frequency identification (RFID) functions or near field communications (NFC) functions that operate based on proximity to the device or application to be accessed. In fact, standard BLUETOOTH wireless interfaces enable the transfer of a secure generated passkey between a hardware token incorporating BLUETOOTH capability and secure device or application. Typical examples of this BLUETOOTH-based capability are the secure association between a mobile phone and a hands-free BLUETOOTH wireless ear-piece, between a mobile phone and a hands-free BLUETOOTH mobile phone application in an automobile and between a BLUETOOTH wireless mouse and a personal computer.

Software tokens may be in the form of electronic data provided to users of secure devices or applications. This electronic data is typically a string of numbers or alphanumeric characters provided to users engaged in a software session with a computer application. The software token electronic data may be sent to users in real-time to a secure device owned by the user while the user is attempting to access a secure application. A typical example of a software token is the automated sending of a string of numeric digits to a user's mobile phone via mobile-based short message service (SMS), commonly known as text messaging, while the user attempts access to an on-line banking website.

Furthermore, many hardware-based token solutions have been introduced to prevent unauthorized access to secure physical facilities. Accurate authentication of the identity of users or entities attempting to access office buildings, homes, automobiles, garages, gates, etc. has become somewhat routine. In many cases, so-called "proximity cards" are used as an ownership-based hardware token solution using radio frequency identification (RFID) tags, near field communications (NFC) or other electro-magnetic communications mechanisms to obtain access to physically secure sites. These solutions typically require users to carry the physical hardware token with them, or have them nearby for use, and individuals may be required to carry and maintain multiple hardware tokens for access to multiple websites, computer applications, office buildings, etc. It is desirable, therefore, to have an automated system that enables individuals to use a single hardware token as a universal ownership authentication factor and the hardware device itself to be a commonly used device that individuals have with them at all times.

In today's culture, mobile phones and other similar wireless devices are items that most people carry with them at all times. They are necessities for most people when leaving the house and are unique among the items we deem necessary to keep with us. They are electronic communications devices and are connected to the largest networks in the world while typically supporting multiple wireless communications mechanisms and technologies. These wireless communications mechanisms include both long-range or network-based communications, as is used for cellular-based telecommunications networks, and local or point-to-point short-range communications, as is used for Wi-Fi- or BLUETOOTH-based data communications. The primary identifying characteristic of a particular wireless device is typically the dialable mobile directory number (MDN). The MDN can be up to 15 digits long and is a unique number worldwide among all wireless devices, regardless of country or telecommunications network operator. The format of the MDN has been standardized as the E.164 International Public Telecommunication Number by the International Telecommunications Union, a standards making organization within the United Nations. Because the MDN is unique worldwide to an entity's or individual's mobile service subscription and wireless device, it can be considered an extension of the unique identity of that wireless device's user.

Much of the utility of using an entity's or individual's wireless device as an extension of the identity of the user is enabled by the physical security of wireless devices. Wireless devices are inherently secure due to the properties of digital cellular telecommunications. Digital cellular technology has replaced analog cellular technology worldwide and with this advancement came cellular authentication. Cellular authentication uses a cryptographic security protocol and public key infrastructure that is only made possible by digital communications technology. This cryptographic security protocol prevents a mobile directory number from being used by any wireless device other than the one for which it was originally programmed. The only way to re-use a mobile directory number with another device is by special secure provisioning performed within secure network platforms by the wireless network operator. When this secure provisioning occurs, the mobile directory number is securely and solely associated with the device for which it is used. In the case of GSM networks, the secure wireless device is the subscriber identity module, or SIM card, which is associated with an individual and unique mobile service subscription. This is why a SIM card can be used in any GSM-based mobile phone without notifying the wireless network operator. In the case of CDMA networks, the wireless device is the mobile phone itself as removable SIM cards are typically not commercially supported. The inherent nature of cellular authentication enables strong security of wireless devices. If the wireless device (e.g. a mobile phone) does not authenticate properly with the wireless network, wireless service is denied.

SUMMARY OF THE INVENTION

An object of the present invention is to provide a system and its methods of use, for preventing identify theft of an entity using the entity's wireless device as an authentication factor.

Another object of the present invention is to provide a system, and its methods of use, for detecting identify theft by having an entity's wireless device be representative of the entity's true identity.

Yet another object of the present invention is to provide a system, and its methods of use, for detecting identify theft of an entity employing a Mobile Access Point that detects the presence of the entity's wireless device as it enters into proximity of the Mobile Access Point.

Still another object of the present invention is to provide a system, and its method of use, for detecting identify theft of an entity based on authentication key information stored within the entity's wireless device, the location of the entity's wireless device, the time the location of the entity's wireless device was obtained and the location of the application requiring secure access.

Another object of the present invention is to provide a system, and its method of use, for detecting identify theft of an entity using a multiplicity of Mobile Access Points.

These and other objects of the present invention are achieved in, a method for detecting identity theft of an entity based on data regarding secure access to an application by the entity and the location of an application access event associated with an entity obtained via a wireless connection. Data is obtained regarding an application access event from a data network. A unique identifier representing an entity is determined. Authentication key information is obtained from the entity's wireless device, The location of an application access event is determined. The wireless device location associated with an entity is obtained from a wireless network. An authentication result is generated based on the application access event data, the location of the application access event (associated with the Application Requiring Secure Access), the time the location of the application access event was obtained, the location of the entity's wireless device and the entity's authentication key information.

In another embodiment of the present invention, an apparatus is provided for detecting identity theft of an entity based on detecting the presence of the entity's wireless device as it enters into proximity of a Mobile Access Point. A module detects the proximity of an entity's wireless device. A module provides data regarding an application requiring secure access from a data network. A module is used to obtain a unique identifier representing the entity. A module is used to obtain authentication key information from the entity's wireless device. A module determines the location of an application access event. A module generates an authentication result based on the entity's wireless device, the location of an application access event, the location of a wireless device associated with an entity, the time the location of the application access event was obtained and the wireless device's authentication key information.

BRIEF DESCRIPTION OF THE DRAWINGS

FIG. 7 depicts an exemplary Wireless Device ID Database used to associate unique Wireless Device IDs, Authentication Key Information. Locations of Applications Requiring Secure Access, times and dates when the application access events and locations were obtained and Authentication Results.

DETAILED DESCRIPTION

Figure 1:
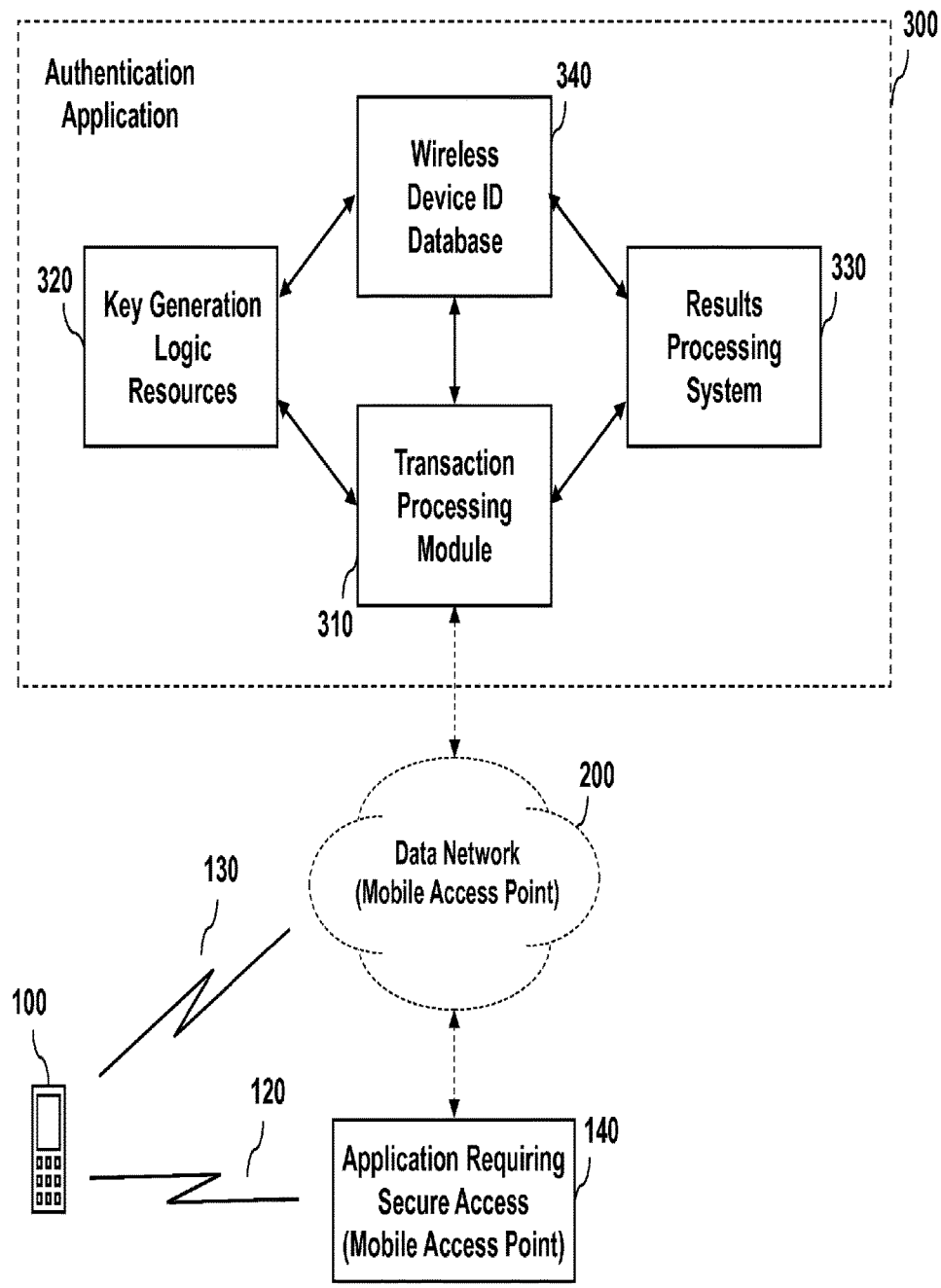
FIG. 1 depicts the functional entities and modules of an exemplary Wireless Device Based User Access Authentication system. Included in the example is an exemplary Authentication Application employing a Transaction Processing Module, a Wireless Device ID Database, one or more Key Generation Logic Resources, a Results Processing System and a Wireless Device communicating with an Application Requiring Secure Access (Mobile Access Point) in accordance with the principles of the present invention.

In accordance with the present invention, there is provided an automated system and method for detecting identity theft of an entity attempting to access a computer application, network, system or device using a wireless device. An authentication result is generated based on the proximity of a user's wireless device to a Mobile Access point associated with an Application Requiring Secure Access, a unique Wireless Device Identifier (ID), Authentication Key Information stored within the wireless device, the location of an application access event and the time the application access event was detected. The concerned Application Requiring Secure Access may process the authentication result and determine the degree of access for which the user, entity or individual is allowed.

In one embodiment of the present invention, an entity's wireless device is representative of the entity's true identity. The use of the wireless device for identity authentication is a robust way of ensuring the true identity of entities accessing a computer application or system. Based on pervasive use of cell phone technology worldwide, it is surmised that an entity's or individual's unique mobile device associated with a unique mobile directory number (MDN) is a reasonable proxy for the identity and current location of the wireless device's owner. In this way, a wireless device may become a strong mechanism for fighting fraud and identity theft that may be perpetrated against the user associated with Applications Requiring Secure Access. This is due to the fact that an individual's mobile phone is almost always on and with them, and the location of an application access event is derived from some local or network wireless or wireline connection.

In accordance with the present invention, a Mobile Access Point includes a communications module to enable the wireless, bidirectional communication with proximate wireless devices. A Mobile Access Point may be defined as a wireless communications mechanism residing on a computing device that enables communications with other wireless devices, such as a cellular network base station, WiMAX base station, Wi-Fi hotspot, a personal computer supporting BLUETOOTH, an RFID reader and the like. The Mobile Access Point receives data transmitted by proximate wireless devices and transmits to the wireless devices any data destined for the wireless devices. In one embodiment, an entity's or individual's wireless device is active, powered on and may communicate with a Mobile Access Point, a local wired communications link or a multiplicity of these communications mechanisms. The wireless device enters into proximity of a Mobile Access Point. The Mobile Access Point is associated with an Application Requiring Secure Access and may be a computer, network or device supporting a short-range or local wireless connection with the wireless device such as BLUETOOTH, Wi-Fi, RFID, NFC and the like. Similarly, the Application Requiring Secure Access may be a computer, network or device supporting a long-range or network wireless connection with the wireless device such as cellular, WiMAX and the like. Examples of Applications Requiring Secure Access are Internet website applications such as on-line banking applications, on-line merchant applications or any website application requiring secure access. In these examples, the website applications may be rendered on a personal computer supporting BLUETOOTH communications, Wi-Fi communications, RFID, NFC or the like. Other examples of Applications Requiring Secure Access and associated with a Mobile Access Point are computers themselves where usernames and passwords enable access to computer operations and, keyless entry into buildings where key fobs or RFID-based proximity cards are required. Depending on the particular Mobile Access Point and its associated wireless technology, proximity may be anywhere from several feet to several miles.

The Mobile Access Point may detect the presence of the wireless device and similarly, the wireless device may detect the presence of the Mobile Access Point. The Mobile Access Point may obtain data transmitted from the proximate wireless device and communicate with the wireless device to acknowledge its presence. Similarly, the wireless device may obtain data transmitted from the proximate Mobile Access Point and communicate with the Mobile Access Point to acknowledge its presence. This is achieved using the appropriate protocol supported by the Mobile Access Point, for example, BLUETOOTH, Wi-Fi, etc. which support automated presence detection.

In one embodiment of the present invention, an Authentication Application is associated with the Application Requiring Secure Access which is further associated with the Mobile Access Point. The Authentication Application may be resident with the Mobile Access Point, the Application Requiring Secure Access or both. The Application Requiring Secure Access communicates with the Authentication Application. Both of these applications may be resident on the same computing platform or the Authentication Application may be external to the Application Requiring Secure Access and supporting it by means of data communications via a Data Network, such as the public Internet or a private data network connection. Alternatively, the Authentication Application may be resident on a portable or removable computing device or non-volatile memory device such as a removable memory card, memory stick, USB-based flash memory drive, portable hard disk drive and the like that may be supported by the Application Requiring Secure Access.

Among the benefits of the Authentication Application being resident on a portable or removable device is that the application may be disassociated from the Mobile Access Point and may be used with a multiplicity of applications, computing platforms and Mobile Access Points. Regardless of the platform where the Authentication Application resides, it is associated with the entity's or individual's wireless device as well as the unique Wireless Device ID. If the Authentication Application is resident on a portable or removable device, the application may be separate from the wireless device itself. This separation enables the Authentication Application to be associated with a multiplicity of computing devices that may be used to support identity theft detection for a particular entity or individual. In the present invention, the Authentication Application processes application access events associated with the detection of identity theft. An application access event may occur when the individual's wireless device is detected based on it's presence and proximity to a Mobile Access Point and the process of authenticating the individual is initially invoked. Alternatively, an application access event may occur based on some manual invocation by the wireless device user, on the wireless device itself, via the Application Requiring Secure Access, via the platform supporting the Application Requiring Secure Access or via the platform supporting the Mobile Access point. Non-limiting examples of manual invocation of the application access events may be via the wireless device user invoking an application on the wireless device, entering a series of keystrokes on the wireless device, invoking an application associated with the Application Requiring Secure Access, the Application Requiring Secure Access itself, invoking an application associated with the Mobile Access Point and the like.

An application access event may result in the Authentication Application obtaining an Application ID representing, and associated with, the Application Requiring Secure Access, the Wireless Device ID, Authentication Key Information, the date and time of the application access event and the Location of the Application Access Event. The Authentication Application may use these information elements to generate accurate Authentication Results.

The Authentication Application is comprised primarily of a Transaction Processing Module, a Wireless Device ID Database, one or more Key Generation Logic Resources and a Results Processing System. These modules and systems may exist separately, be on different but related and associated computing platforms, or may exist as combined logical processes on the same computing platform.

A Transaction Processing Module enables communications, transmission and reception of data associated with the functions of the Authentication Application and supports the basic communications with one or more Applications Requiring Secure Access to receive appropriate application access event data and to return appropriate Authentication Results.

A Wireless Device Identity (ID) Database enables the association of a unique Wireless Device ID, Authentication Key Information, a Location of the Application Access Event, the date and time of the application access event and Authentication Results.

One or more Key Generation Logic Resources may be used to generate the Authentication Key Information or some authentication key value that is used by a Results Processing System to generate particular Authentication Results.

A Results Processing System is used to generate the Authentication Results based on the Application ID, the Wireless Device ID, Authentication Key Information, the Location of the Application Access Event and the date and time of the application access event.

An optional data network may be used, such as the Internet, to provide communications between the Authentication Application and the Application Requiring Secure Access in instances where these two applications are not resident on the same computing device or platform.

In one embodiment of the present invention, a Wireless Device Authentication Application is associated with the an entity's or individual's wireless device. The Wireless Device Authentication Application communicates with an Authentication Application via a Mobile Access point associated with an Application Requiring Secure Access by way of a wireless connection. The wireless connection may be a short-range or local wireless connection such as BLUETOOTH, Wi-Fi, RFID, NFC and the like. Similarly, the wireless connection may be a long-range or network wireless connection such as cellular, WiMAX and the like. The Wireless Device Authentication Application may be downloaded to the wireless device, previously installed on the wireless device, transferred to the wireless device from some other computing device or computer storage via a communications mechanism such as USB, or otherwise resident on the wireless device. Alternatively, the Wireless Device Authentication Application may be resident on a portable or removable computing device or non-volatile memory device such as a removable memory card, memory stick, USB-based flash memory drive, portable hard disk drive and the like that may be supported by the wireless device. Regardless of the platform where the Wireless Device Authentication Application resides, it is associated with the entity's or individual's wireless device as well as the unique Wireless Device ID. Among the benefits of the Wireless Device Authentication Application being resident on a portable or removable device is that the application may be separate from the wireless device itself. This separation enables the Wireless Device Authentication Application to be associated with a multiplicity of wireless devices that may be used to support identity theft detection for a particular entity or individual.

The Wireless Device Authentication Application supports a mechanism for generating Authentication Key Information, a module for securely storing Authentication Key Information and may use a short-range local wireless communications interface, a long-range network wireless communications interface or both. The use of multiple wireless communications interfaces may be achieved, for example, by the wireless device supporting multiple wireless technologies, such as both cellular digital wireless technology and BLUETOOTH wireless technology. The wireless device could then become associated with multiple Mobile Access Points enabling the Wireless Device Authentication Application to support, or make use of, multiple wireless interfaces.

When the wireless device enters into proximity of a Mobile Access Point associated with an Application Requiring Secure Access, the wireless device automatically detects the Mobile Access Point. Alternatively, when the wireless device enters into proximity of a Mobile Access Point associated with an Application Requiring Secure Access, the Mobile Access Point automatically detects the wireless device. The wireless device and the Mobile Access Point subsequently establish and maintain a wireless communications connection. A non-limiting example of this method is the BLUETOOTH short-range wireless communications protocol enabling automated detection of the presence among wireless devices.

An application access event may occur when the individual's wireless device is detected based on it's presence and proximity to a Mobile Access Point and the process of authenticating the individual is initially invoked. Alternatively, an application access event may occur based on some manual invocation by the wireless device user, on the wireless device itself, via the Application Requiring Secure Access, via the platform supporting the Application Requiring Secure Access or via the platform supporting the Mobile Access point. Non-limiting examples of manual invocation of the application access event may be via the wireless device user invoking an application on the wireless device, entering a series of keystrokes on the wireless device, invoking an application associated with the Application Requiring Secure Access, the Application Requiring Secure Access performing an automated invocation itself, invoking an application associated with the Mobile Access Point and the like. When an application access event is invoked either manually by the user of the wireless device or autonomously by an Application Requiring Secure Access associated with the Mobile Access Point, appropriate application access event data is sent to the Authentication Application. Application access event data may consist of the Wireless Device ID, an Application ID representing, and associated with, the Application Requiring Secure Access, the date and time of the application access event, the Location of the Application Access Event and Authentication Key Information. The Wireless Device ID and Authentication Key Information may be sent from the wireless device to the Mobile Access Point and subsequently to the Authentication Application along with the other related application access data. The Location of the Application Access Event may be obtained from the Application Requiring Secure Access, the Mobile Access Point or otherwise derived from the wireless device via a local wireless connection, a network wireless connection or other platform associated with the Application Requiring Secure Access. The application access event data may be provided via an encrypted communications mechanism to ensure greater security.

The application access event results in the Authentication Application processing the obtained information elements via the Transaction Processing Module and generating Authentication Results. The Authentication Key Information obtained from the wireless device is processed by the Results Processing Module with previously stored Authentication Key Information in the Wireless Device ID Database and associated with a particular wireless device. If the Authentication Key Information stored in the Wireless Device ID Database corresponds properly to the Authentication Key Information obtained from the wireless device and associated with the application access event, then a successful Authentication Result may be produced and sent to the Application Requiring Secure Access via the Transaction Processing Module and access to the concerned application may be allowed. If the Authentication Key Information stored in the Wireless Device ID Database does not correspond to the Authentication Key Information obtained from the wireless device and associated with the application access event, then an unsuccessful Authentication Result may be produced and sent to the Application Requiring Secure Access via the Transaction Processing Module and access to the concerned application may be denied. Furthermore, the generated Authentication Results may be used to determine a degree of access to the Application Requiring Secure Access for which the entity or individual is allowed. The generated Authentication Results along with the associated Application ID for the application access event may be recorded and stored in the Wireless Device ID Database and associated with the particular Wireless Device ID representing the user.

One embodiment of the present invention comprises authentication of a wireless device user attempting to access a secure system using the location of the user's wireless device. The location of the wireless device may be obtained from the Application Requiring Secure Access, from the Mobile Access Point or both. The Application Requiring Secure Access may, for example support, or otherwise make use of, standard and commonly available wireless or cellular network location data services obtained directly from a wireless network operator of from some third-party that commercially supplies this data. Also, the Application Requiring Secure Access may, for example support, or otherwise make use of, standard and commonly available wireless interfaces and computer drivers that may reside on the a computing platform where the Application Requiring Secure Access resides, such as BLUETOOTH or Wi-Fi, which are commonly available on many personal computers today. The location obtained from these places may be in a multiplicity of formats, such as a data communications protocol address (e.g. an Internet Protocol (IP) address), some identifier associated with the location, a geographic place name, latitude and longitude coordinates and the like. The obtained Location of the Application Access Event may be used by the Results Processing System to augment the authentication process resulting in enhanced Authentication Results. A non-limiting example of the use of this location information to augment Authentication Results may be the implementation of a list of locations from which application access is allowed or not allowed. Another example may be that the proximate distance between the wireless device and some other known location may cause either a successful or unsuccessful authentication attempt. Furthermore, multiple locations based on detection of a particular wireless device by multiple Mobile Access Points may be used by the Results Processing System to further augment and enhance Authentication Results based on an application access event.

As a non-limiting example of Wireless Device Based User Authentication, a wireless device is registered and authenticated using digital cellular authentication on a wireless network and has, for example, BLUETOOTH capability. The wireless device is in close proximity to a BLUETOOTH-enabled personal computer. In this non-limiting example, the BLUETOOTH wireless data communications protocol typically supports proximate communications among devices that are within 100 meters of each other. The personal computer is connected to the Internet. In accordance with the present invention, an Authentication Application resides on an externally hosted computing platform and is associated with a web-based Internet Application Requiring Secure Access. The Wireless Device ID (e.g. the MDN) has been previously registered and stored in the Wireless Device ID Database associated with the Authentication Application. Authentication Key Information has been previously generated by Key Generation Logic and stored in the Wireless Device ID Database. Authentication Key Information is associated with the Wireless Device ID in the Wireless Device ID Database. There are a multiplicity of types of Key Generation Logic that exist that may be used to create unique Authentication Key Information to be associated with a particular Wireless Device ID. A non-limiting example of Key Generation Logic may be the Diffie-Hellman Key Agreement Standard as an implementation of U.S. Pat. No. 4,200,770 (Cryptographic Apparatus And Method, by Hellman et al.) and U.S. Pat. No. 4,218,582 (Public Key Cryptographic Apparatus And Method, by Hellman et al.), incorporated herein by reference. One or more Application IDs associated with the Wireless Device ID have been previously registered in the Wireless Device ID Database. The Application IDs represent, and are associated with, an Application Requiring Secure Access. The Application Requiring Secure Access may be a web-based Internet application accessed via a web browser on the personal computer such as an on-line banking application where a user may engage in secure banking transactions, an e-commerce application where a user may purchase goods or services, a social networking application where a user may communicate with friends, a web-based email application where a user can send and receive email and the like. Both the wireless device and personal computer have BLUETOOTH wireless communications connectivity enabled.

Due to proximity of the wireless device to the personal computer, the personal computer detects the presence of the wireless device. Similarly, the wireless device detects the presence of the personal computer. The wireless device and personal computer establish a wireless communications connection via the BLUETOOTH protocol. The wireless device supports a Wireless Device Authentication Application. Authentication Key Information has been previously generated by exemplary Key Generation Logic and previously stored in Secure Key Information Storage associated with the wireless device. A non-limiting example of Key Generation Logic may be the aforementioned Diffie-Hellman Key Agreement Standard. Non-limiting examples of Secure Key Information Storage are fixed internal non-volatile wireless device memory and portable or removable non-volatile memory such as a removable memory card, memory stick, USB-based flash memory drive, portable hard disk drive and the like. An application access event is invoked for the Application Requiring Secure Access by the wireless device user such as logging-on to the aforementioned web-based Internet application. Non-limiting examples of methods for invoking application access events may be the wireless device user submitting knowledge-based authentication factors to the application such as entering a username and password, the wireless device user invoking an "authenticate" application button, the web-based Internet application itself autonomously invoking the application access event and other manual and automated methods. A non-limiting and possibly appropriate example of a convenient username may be the Wireless Device ID (e.g. MDN) of the user's wireless device. When the application access event is invoked, information associated with the application access event is obtained, or otherwise provided or derived, by the Authentication Application associated with the web-based Internet application (i.e. the Application Requiring Secure Access).

The application access event data may be provided via an encrypted communications mechanism to ensure greater security. This information may include the Wireless Device ID, the Application ID representing, and associated with, the web-based Internet application, the date and time of the application access event, the Location of the Application Access Event and Authentication Key Information. As a non-limiting example, the Location of the Application Access Event may be derived, for instance, from the Internet Protocol (IP) address of the personal computer supporting the web-based Internet application. The Authentication Key Information from the Secure Key Information Storage associated with the wireless device may be sent from the wireless device using the aforementioned BLUETOOTH communications protocol, to, for example, the computing platform supporting the Mobile Access Point (i.e. the personal computer) and subsequently sent from the personal computer to the Authentication Application on the externally hosted computing platform via, for example, the Internet. The externally hosted Authentication Application obtains the application access event data via the Transaction Processing Module. The Transaction Processing Module passes the appropriate application access event data such as the Location of the Application Access Event (associated with the Application Requiring Secure Access) and the date and time of the application access event to the Wireless Device ID Database for storage. The Wireless Device ID, Authentication Key Information and the Application ID are correlated with the appropriate entries in the Wireless Device ID Database and the appropriate information elements (e.g. the Wireless Device ID, Authentication Key Information, Location of the Application Access Event, the date and time of the application access event, the Application ID and optionally the wireless device location obtained via the wireless network) are passed to the Results Processing System.

The Results Processing System may then process one or more of these information elements. The Results Processing System primarily uses the Authentication Key Information, but may use other information elements to determine an Authentication Result. If the Results Processing System determines that the Authentication Key Information stored in the Wireless Device ID Database corresponds properly to the Authentication Key Information obtained from the wireless device and associated with the application access event, then a successful Authentication Result may be produced and sent to the Application Requiring Secure Access via the Transaction Processing Module and access to the concerned application may be allowed. If the Authentication Key Information stored in the Wireless Device ID Database does not correspond to the Authentication Key Information obtained from the wireless device and associated with the application access event, then an unsuccessful Authentication Result may be produced and sent to the Application Requiring Secure Access via the Transaction Processing Module and access to the concerned application may be denied. Furthermore, the generated Authentication Results may be used to determine a degree of access to the Application Requiring Secure Access for which the entity or individual is allowed. The generated Authentication Results along with the associated Application ID for the application access event may be recorded and stored in the Wireless Device ID Database and associated with the particular Wireless Device ID representing the user.

Note that an embodiment of the present invention is not limited to wireless devices used as mobile telephones and identified by an MDN. The present invention may apply for use with any wireless device distinguished by a unique identifier.

In FIG. 1, one embodiment of a Wireless Device Based User Authentication system of the present invention includes a Wireless Device 100, an Application Requiring Secure Access associated with the Mobile Access Point 140, an Authentication Application 300 and an optional Data Network associated with the Mobile Access Point 200. The Wireless Device 100 communicates with an Application Requiring Secure Access associated with the Mobile Access Point 140 via a local or point-to-point short-range wireless communications mechanism 120. The Wireless Device 100 may optionally communicate with a Data Network associated with the Mobile Access Point 200 via a long-range or network-based wireless communications mechanism 130. When the Wireless Device 100 enters into proximity of a Mobile Access Point associated with the Application Requiring Secure Access 140, the Wireless Device 100 automatically detects the Mobile Access Point 140 across the wireless communications mechanism 120. Alternatively, when the Wireless Device 100 enters into proximity of a Mobile Access Point associated with the Application Requiring Secure Access 140, the Mobile Access Point 140 automatically detects the Wireless Device 100 across the wireless communications mechanism 120. The Wireless Device 100 and the Mobile Access Point 140 establish and maintain a wireless communications connection. Similarly, the Wireless Device 100 may optionally communicate with a Data Network associated with the Mobile Access Point 200 to enable the Authentication Application 300 to obtain the location of the Wireless Device 100. The location of the Wireless Device 100 may be used to augment or enhance the Authentication Results provided by the Authentication Application 300. The Authentication Application 300 includes a Transaction Processing Module 310, Key Generation Logic Resources 320, a Results Processing System 330 and a Wireless Device ID Database 340, in accordance with the principles of the present invention. The Transaction Processing Module 310 obtains data regarding an application access event from an Application Requiring Secure Access associated with the Mobile Access Point 140. The Transaction Processing Module 310 may communicate with the Application Requiring Secure Access associated with the Mobile Access Point 140 either directly or via an optional Data Network associated with the Mobile Access Point 200. The Transaction Processing Module 310 may communicate with the Key Generation Logic Resources 320 to generate Authentication Key Information for a particular Wireless Device ID during some initial Wireless Device ID registration process. Alternatively. Authentication Key Information may be downloaded to, previously installed or otherwise transferred to the Authentication Application 300 from some other computing device, platform or computer storage and stored in the Wireless Device ID Database 340. The Transaction Processing Module 310 may communicate with the Wireless Device ID Database 340 to provide application access event data for storage such as the Application ID representing, and associated with, the Application Requiring Secure Access 140, the Location of the Application Access Event and the date and time the Location of the Application Access Event was obtained. The Transaction Processing Module 310 may communicate with the Results Processing System 330 to provide application access event data for processing such as the concerned Wireless Device ID, Application ID representing, and associated with, the Application Requiring Secure Access 140, Authentication Key Information, Location of the Application Access Event and the date and time the Location of the Application Access Event was obtained. The Key Generation Logic Resources 320 may communicate with the Wireless Device ID Database 340 to provide generated Authentication Key Information for storage for a particular Wireless Device ID. The Results Processing System 330 may communicate with the Wireless Device ID Database 340 to provide processed Authentication Results for a particular application access event associated with a particular Wireless Device ID and a particular Application ID representing, and associated with, the Application Requiring Secure Access 140. The Results Processing System 330 may communicate with the Transaction Processing Module 310 to provide the Authentication Results to the Application Requiring Secure Access 140 either directly or via an optional Data Network associated with the Mobile Access Point 200. The Application Requiring Secure Access 140 may then apply the Authentication Results to allow access by the user of the Wireless Device 100, deny access to the user of the Wireless Device 100 or provide some degree of access to the user of the Wireless Device 100.

Figure 2:
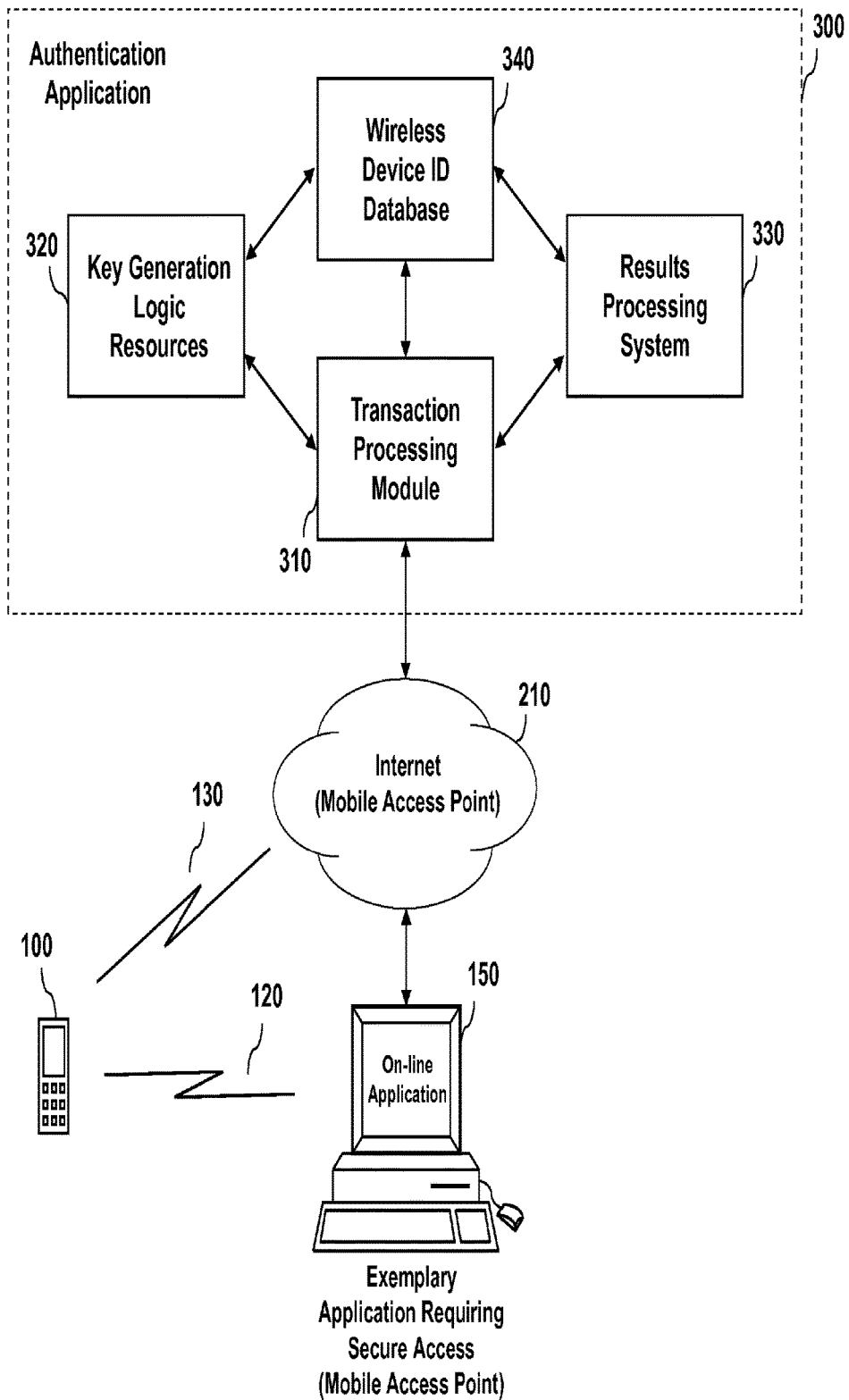
FIG. 2 depicts the functional entities and modules of an exemplary Wireless Device Based User Access Authentication system employed by an On-line Application (Mobile Access Point) and supported by an exemplary Authentication Application.

FIG. 2 depicts the use of one embodiment of a Wireless Device Based User Authentication system by an Exemplary On-line Application Requiring Secure Access 150. One embodiment of an On-line Application Requiring Secure Access 150 may be an Internet-based web application accessed via a personal computer that requires some form of identity authentication before providing access to a user. The Wireless Device 100 communicates with the Exemplary On-line Application Requiring Secure Access associated with the Mobile Access Point 150 (i.e. the personal computer) via a local or point-to-point short-range communications mechanism 120. The Wireless Device 100 may optionally communicate with the Internet associated with the Mobile Access Point 210 via a long-range or network-based communications mechanism 130. When the Wireless Device 100 enters into proximity of the personal computer (i.e. the Mobile Access Point associated with the Exemplary On-line Application Requiring Secure Access 150), the Wireless Device 100 automatically detects the personal computer and establishes and maintains a wireless communications connection with the personal computer across the wireless communications mechanism 120. When the user of the Wireless Device 100 attempts to access the Exemplary On-line Application Requiring Secure Access 150, the Exemplary On-line Application Requiring Secure Access 150 may automatically invoke an application access event. Alternatively, the Exemplary On-line Application Requiring Secure Access 150 may require the user of the Wireless Device 100 to manually take some action to invoke an application access event. The application access event causes the Authentication Application 300 to perform the aforementioned Wireless Device Based User Authentication via the Internet 210. The Authentication Application 300 provides the processed Authentication Results to the Exemplary On-line Application Requiring Secure Access 150 via the Internet 210. The Exemplary On-line Application Requiring Secure Access 150 may then apply the Authentication Results to allow access by the user of the Wireless Device 100, deny access to the user of the Wireless Device 100 or provide some degree of access to the user of the Wireless Device 100.

Figure 3:
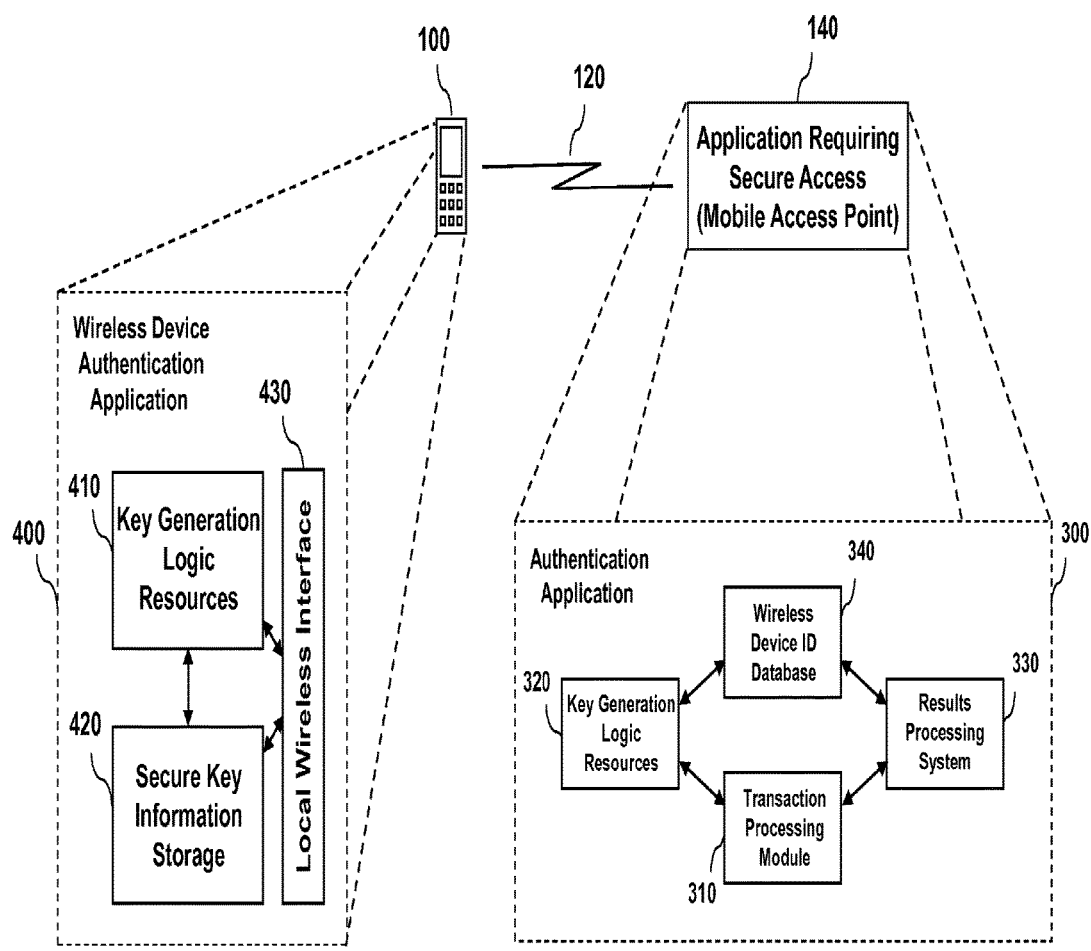
FIG. 3 depicts the functional entities and modules employed by a Wireless Device of an exemplary Wireless Device Based User Access Authentication system. Included in the example is an exemplary Wireless Device Authentication Application employing a Local Wireless Interface, one or more Key Generation Logic Resources and Secure Key Information Storage communicating with an Application Requiring Secure Access (Mobile Access Point) in accordance with the principles of the present invention.

FIG. 3 depicts one embodiment of a Wireless Device Based User Authentication system employing a Wireless Device Authentication Application 400 associated with, and resident on, a Wireless Device 100, a local or point-to-point short-range wireless communications mechanism 120 supporting wireless communications between the Wireless Device 100 and an Application Requiring Secure Access associated with the Mobile Access Point 140 via a Local Wireless Interface 430 on the Wireless Device 100. In this embodiment of the present invention, an Authentication Application 300 is resident with the Application Requiring Secure Access associated with the Mobile Access Point 140. The Authentication Application 300 for the Application Requiring Secure Access 140 has been previously downloaded, installed or otherwise transferred from some other computing device, platform or computer storage to the Application Requiring Secure Access associated with the Mobile Access Point 140. The Wireless Device Authentication Application 400 includes Key Generation Logic Resources 410, Secure Key Information Storage 420 and a Local Wireless Interface 430. The Key Generation Logic Resources 410 may be used to generate Authentication Key Information for the Wireless Device 100 during some initial registration process. Alternatively, Authentication Key Information may be downloaded to, previously installed or otherwise transferred to the Wireless Device 100 from some other computing device, platform or computer storage and stored in Secure Key Information Storage 420 on the Wireless Device 100. When the Wireless Device 100 enters into proximity of a Mobile Access Point associated with the Application Requiring Secure Access 140, the Wireless Device 100 automatically detects the Mobile Access Point 140 across the wireless communications mechanism 120 via the Local Wireless Interface 430. Alternatively, when the Wireless Device 100 enters into proximity of a Mobile Access Point associated with the Application Requiring Secure Access 140, the Mobile Access Point 140 automatically detects the Wireless Device 100 across the wireless communications mechanism 120 via the Local Wireless Interface 430. The Wireless Device 100 and the Mobile Access Point 140 establish and maintain a wireless communications connection. When the user of the Wireless Device 100 attempts to access the Application Requiring Secure Access 140, the Application Requiring Secure Access 140 may automatically invoke an application access event. Alternatively, the Application Requiring Secure Access 140 may require the user of the Wireless Device 100 to manually take some action to invoke an application access event. The application access event causes the Authentication Application 300 to perform the aforementioned Wireless Device Based User Authentication within the same computing platform as the Application Requiring Secure Access. The Authentication Application 300 provides the processed Authentication Results to the Application Requiring Secure Access 140 internally. The Application Requiring Secure Access 140 may then apply the Authentication Results to allow access by the user of the Wireless Device 100, deny access to the user of the Wireless Device 100 or provide some degree of access to the user of the Wireless Device 100.

Figure 4:
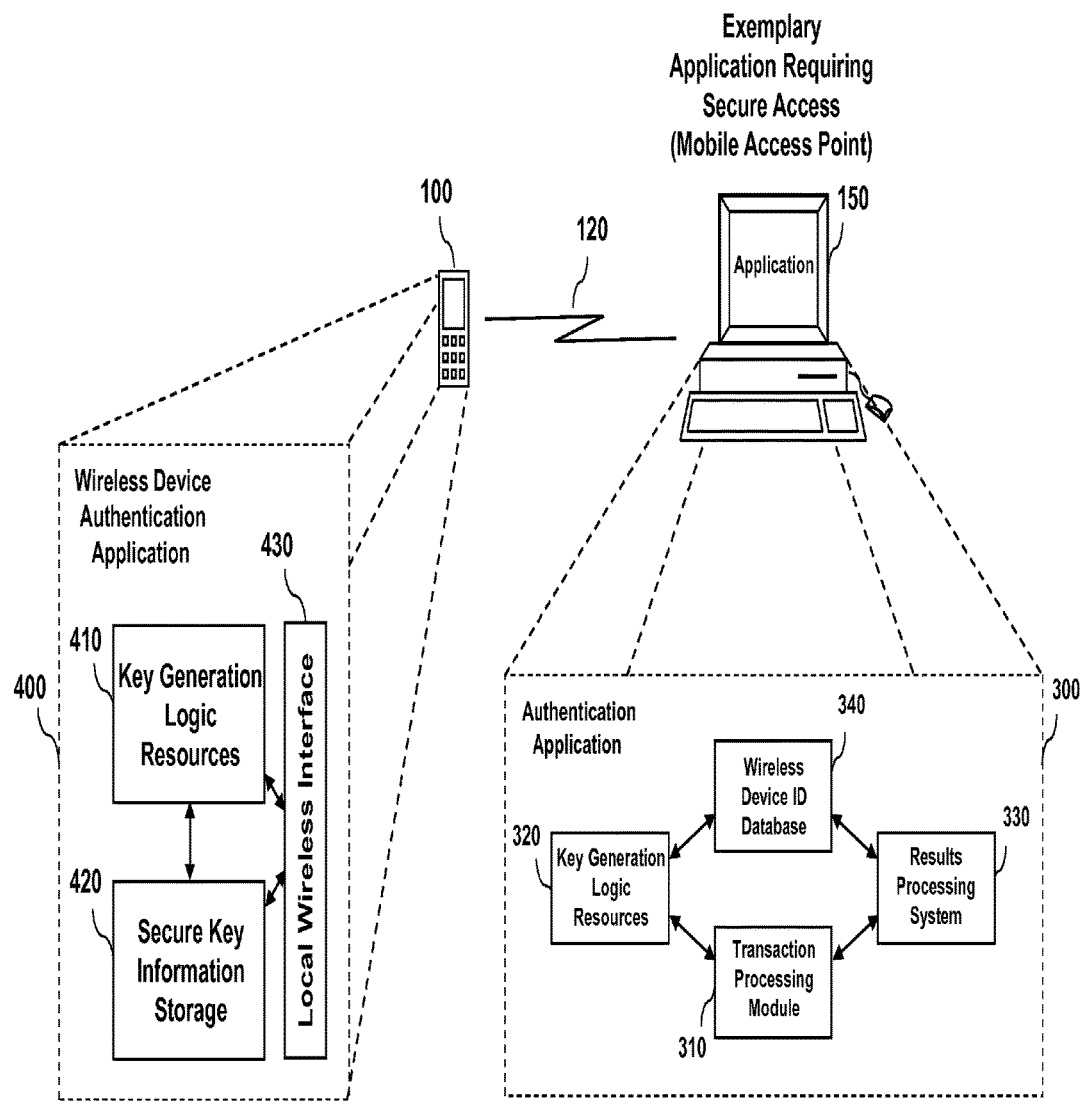
FIG. 4 depicts the functional entities and modules employed by a Wireless Device of an exemplary Wireless Device Based User Access Authentication system employing a Local Wireless Interface accessing an On-line Application (Mobile Access Point) and supported by an exemplary Wireless Device Authentication Application.

FIG. 4 depicts the use of one embodiment of a Wireless Device Based User Authentication system using a Wireless Device Based User Authentication system employing a Wireless Device Authentication Application 400 associated with, and resident on, a Wireless Device 100, a local or point-to-point short-range wireless communications mechanism 120 supporting wireless communications between the Wireless Device 100 and an Exemplary Application Requiring Secure Access associated with the Mobile Access Point 150 via a Local Wireless Interface 430 on the Wireless Device 100. The Exemplary Application Requiring Secure Access 150 is resident on a personal computer. The Authentication Application 300 for the Exemplary Application Requiring Secure Access 150 has been previously downloaded, installed or otherwise transferred from some other computing device, platform or computer storage to the Exemplary Application Requiring Secure Access associated with the Mobile Access Point 150 resident on the personal computer. The Wireless Device Authentication Application 400 includes Key Generation Logic Resources 410, Secure Key Information Storage 420 and a Local Wireless Interface 430. The Key Generation Logic Resources 410 may be used to generate Authentication Key Information for the Wireless Device 100 during some initial registration process. Alternatively, Authentication Key Information may be downloaded to, previously installed or otherwise transferred to the Wireless Device 100 from some other computing device, platform or computer storage and stored in Secure Key Information Storage 420 on the Wireless Device 100. When the Wireless Device 100 enters into proximity of the Mobile Access Point associated with the Exemplary Application Requiring Secure Access 150 on the personal computer, the Wireless Device 100 automatically detects the Mobile Access Point 150 across the wireless communications mechanism 120 via the Local Wireless Interface 430. Alternatively, when the Wireless Device 100 enters into proximity of the Mobile Access Point associated with the Exemplary Application Requiring Secure Access 150, the Mobile Access Point 150 automatically detects the Wireless Device 100 across the wireless communications mechanism 120 via the Local Wireless Interface 430. The Wireless Device 100 and the Mobile Access Point 150 establish and maintain a wireless communications connection. When the user of the Wireless Device 100 attempts to access the Exemplary Application Requiring Secure Access 150, the Exemplary Application Requiring Secure Access 150 may automatically invoke an application access event. Alternatively, the Exemplary Application Requiring Secure Access 150 may require the user of the Wireless Device 100 to manually take some action to invoke an application access event. The application access event causes the Authentication Application 300 to perform the aforementioned Wireless Device Based User Authentication within the same computing platform as the Exemplary Application Requiring Secure Access 150. The Authentication Application 300 provides the processed Authentication Results to the Exemplary Application Requiring Secure Access 150 internally. The Exemplary Application Requiring Secure Access 150 may then apply the Authentication Results to allow access by the user of the Wireless Device 100, deny access to the user of the Wireless Device 100 or provide some degree of access to the user of the Wireless Device 100.

Figure 5:
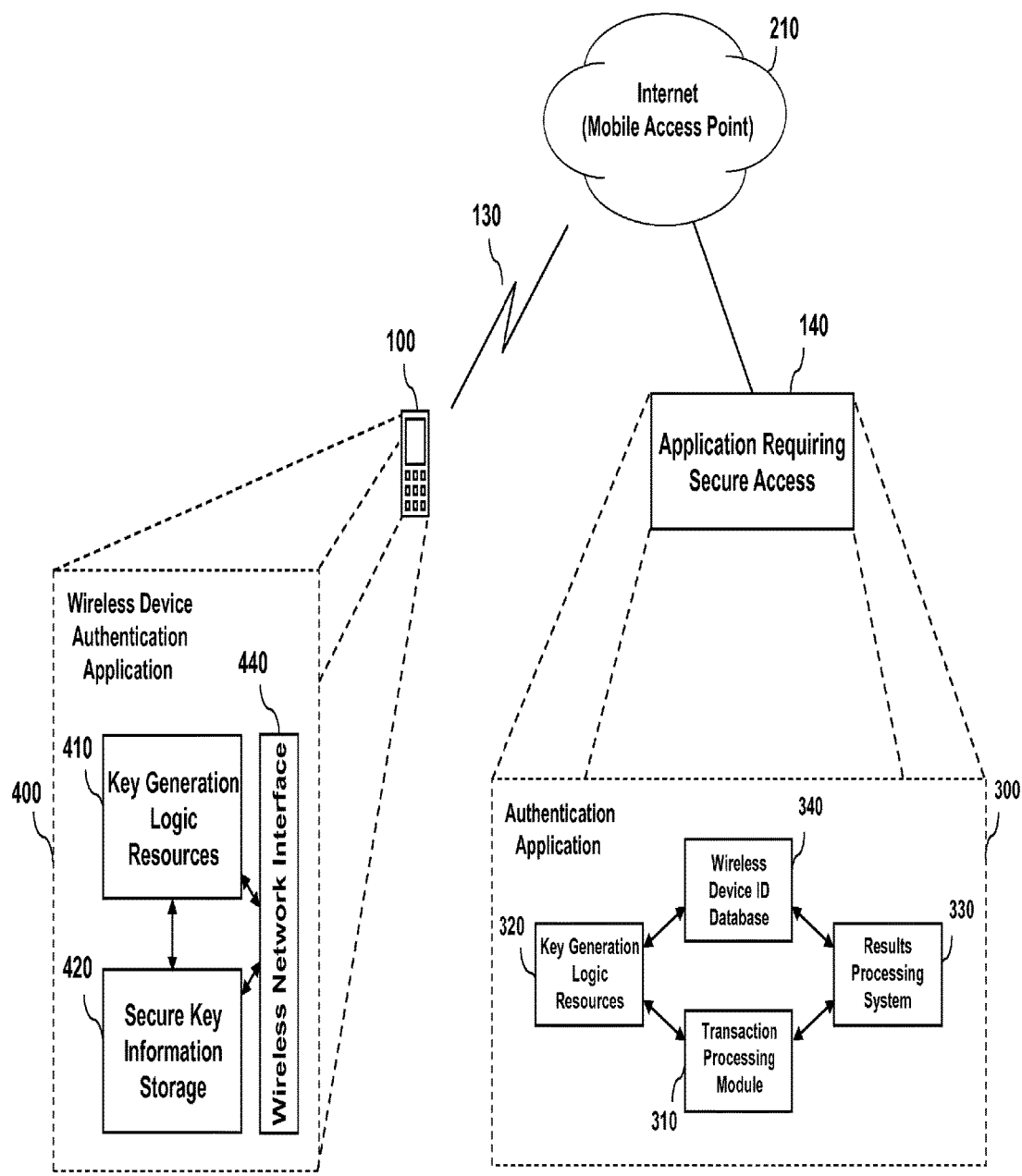
FIG. 5 depicts the functional entities and modules employed by a Wireless Device of an exemplary Wireless Device Based User Access Authentication system. Included in the example is an exemplary Wireless Device Authentication Application employing a Network Wireless Interface, one or more Key Generation Logic Resources and Secure Key Information Storage communicating with an Application Requiring Secure Access (Mobile Access Point) in accordance with the principles of the present invention.

FIG. 5 depicts one embodiment of a Wireless Device Based User Authentication system employing a Wireless Device Authentication Application 400 associated with, and resident on, a Wireless Device 100, a network long-range wireless Internet communications mechanism 130 supporting wireless communications between the Wireless Device 100 and an Application Requiring Secure Access 140 via a Wireless Network Interface 430 on the Wireless Device 100. In this embodiment of the present invention, an Authentication Application 300 is resident with the Application Requiring Secure Access 140. The Mobile Access Point is associated with the Internet 210. The Authentication Application 300 for the Application Requiring Secure Access 140 has been previously downloaded, installed or otherwise transferred from some other computing device, platform or computer storage to the Application Requiring Secure Access 140. The Wireless Device Authentication Application 400 includes Key Generation Logic Resources 410, Secure Key Information Storage 420 and a Local Wireless Interface 440. The Key Generation Logic Resources 410 may be used to generate Authentication Key Information for the Wireless Device 100 during some initial registration process. Alternatively, Authentication Key Information may be downloaded to, previously installed or otherwise transferred to the Wireless Device 100 from some other computing device, platform or computer storage and stored in Secure Key Information Storage 420 on the Wireless Device 100. When the Wireless Device 100 enters into proximity of the Mobile Access Point 210, for example within a range of up to approximately 100 meters if BLUETOOTH wireless technology is used, the Wireless Device 100 automatically detects the Mobile Access Point 210 across the wireless network communications mechanism 130 via the Wireless Network Interface 440. Alternatively, when the Wireless Device 100 enters into proximity of the Mobile Access Point 210, the Mobile Access Point 210 automatically detects the Wireless Device 100 across the wireless network communications mechanism 130 via the Wireless Network Interface 440. The Wireless Device 100 and the Mobile Access Point 210 establish and maintain a wireless communications connection. When the user of the Wireless Device 100 attempts to access the Application Requiring Secure Access 140, the Application Requiring Secure Access 140 may automatically invoke an application access event. Alternatively, the Application Requiring Secure Access 140 may require the user of the Wireless Device 100 to manually take some action to invoke an application access event. The application access event causes the Authentication Application 300 to perform the aforementioned Wireless Device Based User Authentication within the same computing platform as the Application Requiring Secure Access. The Authentication Application 300 provides the processed Authentication Results to the Application Requiring Secure Access 140 internally. The Application Requiring Secure Access 140 may then apply the Authentication Results to allow access by the user of the Wireless Device 100, deny access to the user of the Wireless Device 100 or provide some degree of access to the user of the Wireless Device 100.

Figure 6:
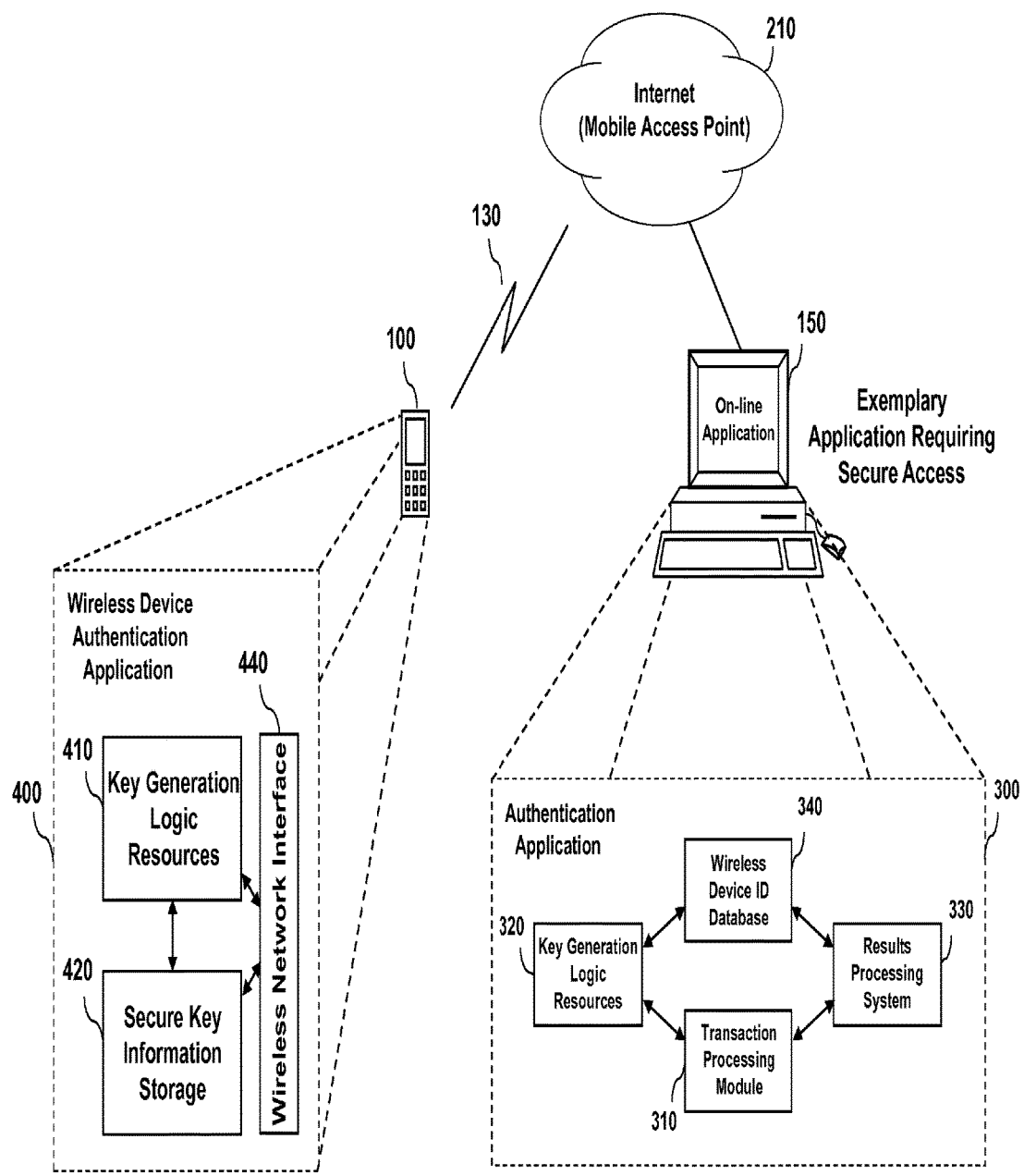
FIG. 6 depicts the functional entities and modules employed by a Wireless Device of an exemplary Wireless Device Based User Access Authentication system employing a Network Wireless Interface accessing an On-line Application (Mobile Access Point) and supported by an exemplary Wireless Device Authentication Application.

FIG. 6 depicts one embodiment of a Wireless Device Based User Authentication system employing a Wireless Device Authentication Application 400 associated with, and resident on, a Wireless Device 100, a network long-range wireless Internet communications mechanism 130 supporting wireless communications between the Wireless Device 100 and an Exemplary On-line Application Requiring Secure Access 150 on a personal computer via a Wireless Network Interface 440 on the Wireless Device 100. In this embodiment of the present invention, an Authentication Application 300 is resident with the Exemplary On-line Application Requiring Secure Access 150 on the personal computer. The Mobile Access Point is associated with the Internet 210. The Authentication Application 300 for the Exemplary On-line Application Requiring Secure Access 150 has been previously downloaded, installed or otherwise transferred from some other computing device, platform or computer storage to the Exemplary On-line Application Requiring Secure Access 150. The Wireless Device Authentication Application 400 includes Key Generation Logic Resources 410, Secure Key Information Storage 420 and a Local Wireless Interface 440. The Key Generation Logic Resources 410 may be used to generate Authentication Key Information for the Wireless Device 100 during some initial registration process. Alternatively, Authentication Key Information may be downloaded to, previously installed or otherwise transferred to the Wireless Device 100 from some other computing device, platform or computer storage and stored in Secure Key Information Storage 420 on the Wireless Device 100. When the Wireless Device 100 enters into proximity of the Mobile Access Point 210, for example within a range of up to approximately 100 meters if BLUETOOTH wireless technology is used, the Wireless Device 100 automatically detects the Mobile Access Point 210 across the wireless network communications mechanism 130 via the Wireless Network Interface 440. Alternatively, when the Wireless Device 100 enters into proximity of the Mobile Access Point 210, the Mobile Access Point 210 automatically detects the Wireless Device 100 across the wireless network communications mechanism 130 via the Wireless Network Interface 440. The Wireless Device 100 and the Mobile Access Point 210 establish and maintain a wireless communications connection. When the user of the Wireless Device 100 attempts to access the Exemplary On-line Application Requiring Secure Access 150, the Exemplary On-line Application Requiring Secure Access 150 may automatically invoke an application access event. Alternatively, the Exemplary On-line Application Requiring Secure Access 150 may require the user of the Wireless Device 100 to manually take some action to invoke an application access event. The application access event causes the Authentication Application 300 to perform the aforementioned Wireless Device Based User Authentication within the same computing platform as the Application Requiring Secure Access. The Authentication Application 300 provides the processed Authentication Results to the Exemplary On-line Application Requiring Secure Access 150 internally. The Application Requiring Secure Access 150 may then apply the Authentication Results to allow access by the user of the Wireless Device 100, deny access to the user of the Wireless Device 100 or provide some degree of access to the user of the Wireless Device 100.

FIG. 7 depicts exemplary entries in an exemplary Wireless Device ID Database 340 shown in FIGS. 1, 2, 3, 4, 5 and 6. In particular, as depicted in FIG. 7, a first entry 346 includes an association among an individual's Wireless Device ID 341 (e.g. in this case an MDN), Authentication Key Information 342, the Location of the Application Access Event 343, the date and time the Location of the Application Access Event was obtained 344 and Authentication Results 345. The Wireless Device ID is used by the exemplary Wireless Device ID Database 340 in FIGS. 1, 2, 3, 4, 5 and 6. The Wireless Device ID may be used as the primary parameter used to associate data from the Wireless Device ID Database 340 in FIGS. 1, 2, 3, 4, 5 and 6 to be used by the Results Processing System 330 in FIGS. 1, 2, 3, 4, 5 and 6 to generate Authentication Results 345. The entry for the individual's Authentication Key Information 342 may be provided directly by the Key Generation Logic Resources 320 in FIGS. 1, 2, 3, 4, 5 and 6 or may be populated via some other method such as by downloading, installing or otherwise transferring from some other computing device, platform or computer storage during some registration process. The entries for Authentication Key Information 342 represent unique data in a multiplicity of formats that corresponds with Authentication Key Information stored in Secure Key Information Storage 420 associated with a Wireless Device Authentication Application 400 resident with a Wireless Device 100 shown in FIGS. 1, 2, 3, 4, 5 and 6 and identified by the Wireless Device ID 341. The entries for Location of the Application Access Event 343 may be in a multiplicity of formats and may be pre-populated and resolved for the obtained Location of the Application Access Event 343 or otherwise derived based upon known mapping information within the database. Non-limiting examples of the Location of the Application Access Event 343 value obtained via the Mobile Access Point FIGS. 1, 140 and 200 and FIGS. 2, 150 and 210 may be a Geographic Name, an identifier (ID) associated with a Mobile Access Point FIGS. 1, 140 and 200 and FIGS. 2, 150 and 210, an Address such as a street number, name, city, state, county, postal code or country, or may be of the format of a network address such as an Internet Protocol (IP) address in the form of XX.XX.XX.XX or some other network address format, latitude or longitude coordinates or any other projection coordinates that may be associated with a geographic place that facilitates the generation of Authentication Results 345 by the Results Processing System 330 in FIGS. 1, 2, 3, 4, 5 and 6. The Date and Time 344 entries may, for example, represent a date and time of a particular obtained and corresponding Location of an Application Access Event 343 or Wireless Device location 330 in FIGS. 1, 2, 3, 4, 5 and 6 to assist in determining, for example, corresponding Authentication Results 345. The Authentication Results 345 contains entries in the database that associate a particular Application ID associated with an Application Requiring Secure Access 140 in FIGS. 1, 3 and 5 and 150 in FIGS. 2, 4 and 6 received along with other related application access event data for the particular application access event. The Results Value 345 for the associated Wireless Device ID 341 is generated based on the application access event data and the associated and corresponding Authentication Key Information 342 due to the application access event.

Figure 8:
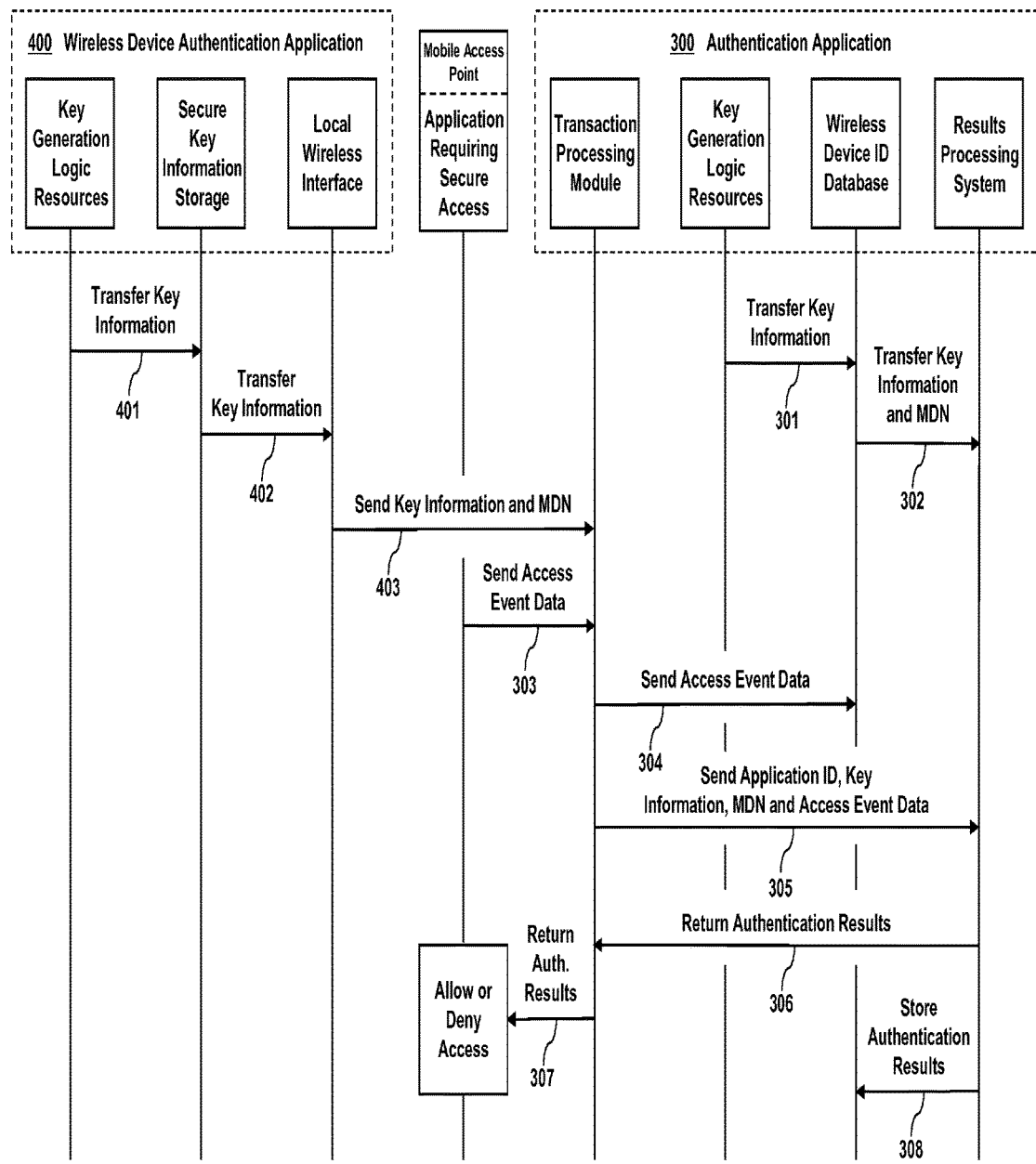
FIG. 8 depicts an exemplary information flow diagram of a Wireless Device Based User Authentication system.

FIG. 8 is a non-limiting and exemplary detailed information and system flow diagram representing the operation of a Wireless Device Based User Authentication system, in accordance with one embodiment of the present invention. In this exemplary information and system flow, an entity or individual may initially invoke either manually or automatically some transaction or application access attempt resulting in an application access event that causes Wireless Device Based User Authentication to occur in accordance with the principles of the present invention.

Step 401: In the Wireless Device and associated with the Wireless Device Authentication Application 400, Authentication Key Information has been previously generated by Key Generation Logic and is transferred to Secure Key Information Storage. Alternatively, Authentication Key Information may be downloaded to, previously installed or otherwise transferred to the Wireless Device Authentication Application 400 from some other computing device, platform or computer storage and stored in Secure Key Information Storage.

Step 402: When some application access event occurs, Authentication Key Information is transferred to the Local Wireless Interface of the Wireless Device and associated with the Wireless Device Authentication Application 400. The application access event may cause the Authentication Key Information to be autonomously sent from Secure Key Information Storage to the Local Wireless Interface or otherwise be requested from Secure Key information Storage.

Step 403: Authentication Key Information and optionally the Wireless Device ID, in this case in the form of an MDN, is sent either to directly to the Transaction Processing Module of the Authentication Application 300 or may be sent indirectly to the Transaction Processing Module of the Authentication Application 300 via the Application Requiring Secure Access and associated with a Mobile Access Point. In this case, the Authentication Key Information and optionally the MDN are sent directly to the Transaction Processing Module of the Authentication Application 300.

Step 301: In the Authentication Application 300, Authentication Key Information has been previously generated by Key Generation Logic and is transferred to the Wireless Device ID Database. Alternatively, Authentication Key Information may be downloaded to, previously installed or otherwise transferred to the Authentication Application 300 from some other computing device, platform or computer storage and stored in the Wireless Device ID Database.

Step 302: When some application access event occurs, Authentication Key Information is transferred to the Results Processing System of the Authentication Application 300.

Step 303: Either the Application Requiring Secure Access or the Mobile Access Point sends application access event data to the Transaction Processing Module of the Authentication Application 300. Examples of the application access event data are the Application ID, Location of the Application Access Event and the date and time the Location of the Application Access Event was obtained.

Step 304: The Transaction Processing Module sends the previously accumulated and appropriate application access event data associated with the particular application access attempt by the particular Wireless Device user to the Wireless Device ID Database for storage, for example, the Application ID, the Location of the Application Requiring Secure Access and the date and time of the Application Access Event.

Step 305: The Transaction Processing Module sends the previously accumulated Application ID, Authentication Key Information, MDN and other related access event data to the Results Processing System to generate Authentication Results for the particular application access attempt.

Step 306: When the Authentication Results are generated, the Results Processing System returns them to the Transaction Processing Module for subsequent delivery to the Application Requiring Secure Access.

Step 307: The Transaction Processing Module returns the Authentication Results to the Application Requiring Secure Access. The Application Requiring Secure Access may then apply the received Authentication Results to the application access attempt and determine whether to allow access, deny access or otherwise provide some degree of access to the Application Requiring Secure Access for the Wireless Device user.

Step 308: The Results Processing System stores the appropriate Authentication Results for the concerned Application ID in the Wireless Device ID Database for the corresponding Wireless Device ID representing the user.

Figure 9:
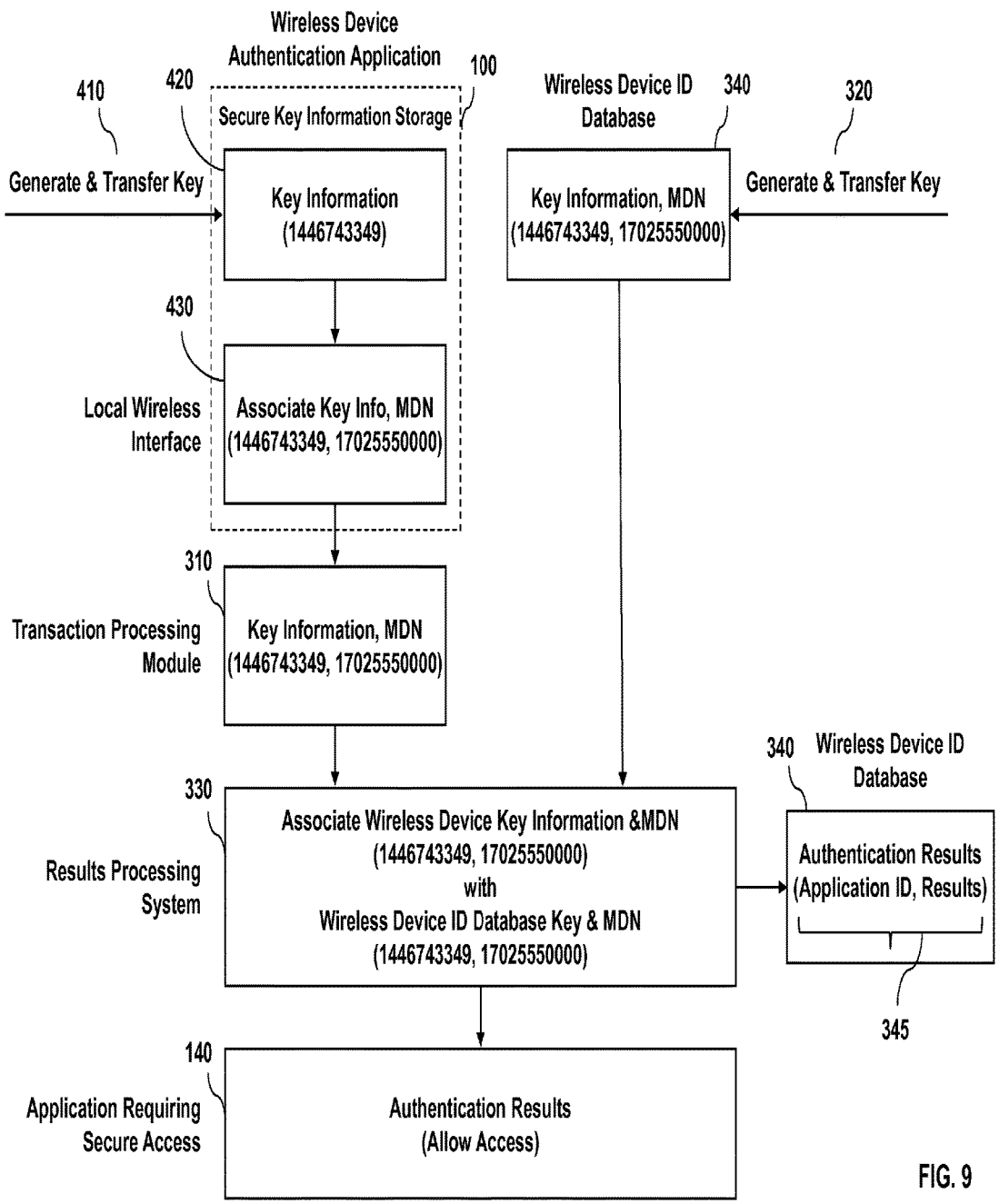
FIG. 9 depicts an exemplary process flow diagram of a Wireless Device Based User Authentication system resulting in a successful authentication process where access is allowed.

FIG. 9 is an exemplary detailed process flow diagram representing the operation of a Wireless Device Based User Authentication system resulting in a successful Authentication Result. In this exemplary process flow, an entity or individual may initially invoke either manually or automatically some transaction or application access attempt resulting in an application access event that causes Wireless Device Based User Authentication to occur in accordance with the principles of the present invention. Authentication Key Information has been previously generated by Key Generation Logic and is transferred 410 to Secure Key Information Storage 420 associated with the Wireless Device Authentication Application. Alternatively, Authentication Key Information may be downloaded to, previously installed or otherwise transferred to the Wireless Device Authentication Application from some other computing device, platform or computer storage and stored in Secure Key Information Storage 420. In this exemplary case, the value of the Authentication Key Information is a ten-digit string of numbers "1446743349." Authentication Key Information has been previously generated by Key Generation Logic and is transferred 320 to the Wireless Device ID Database 340 associated with the Authentication Application. Alternatively, Authentication Key Information may be downloaded to, previously installed or otherwise transferred to the Wireless Device ID Database from some other computing device, platform or computer storage and stored in the Wireless Device ID Database 340. In this exemplary case, the value of the Authentication Key Information is a ten-digit string of numbers "1446743349." In the Wireless Device Authentication Application, the Authentication Key Information "1446743349" is associated with the Wireless Device ID, in this exemplary case, the MDN value "17025550000" for the Local Wireless Interface 430. Similarly, the Authentication Key Information "1446743349" is associated with the Wireless Device ID, in this exemplary case, the MDN value "17025550000" in the Wireless Device ID Database 340. The Authentication Key Information and MDN of the Wireless Device and associated with the Wireless Device Authentication Application 400 are sent to the Transaction Processing Module 310 of the Authentication Application. The Authentication Key Information and MDN are sent from the Transaction Processing Module 310 to the Results Processing System 330. Similarly, the Authentication Key Information and MDN from the Wireless Device ID Database 340 and associated with the Authentication Application are sent to the Results Processing System 330 of the Authentication Application. The Results Processing System 330 associates the Authentication Key Information and MDN, in this case the values "1446743349" and "17025550000." respectively, obtained from the Wireless Device Authentication Application 400, with the Authentication Key Information and MDN, in this case the values "1446743349" and "17025550000," respectively, obtained from the Wireless Device ID Database 340. The Results Processing System 330 generates a successful Authentication Result as the respective values for both Authentication Key Information parameters and both MDN parameters correspond, and in this exemplary case, match. The Results Processing System 330 then returns the Authentication Results to the Application Requiring Secure Access 140 enabling the Application Requiring Secure Access 140 to allow access to the user of the Wireless Device. The Results Processing System 330 also stores the Authentication Results 345 in the form of an Application ID and a successful Result to the Wireless Device ID Database of the Authentication Application.

Figure 10:
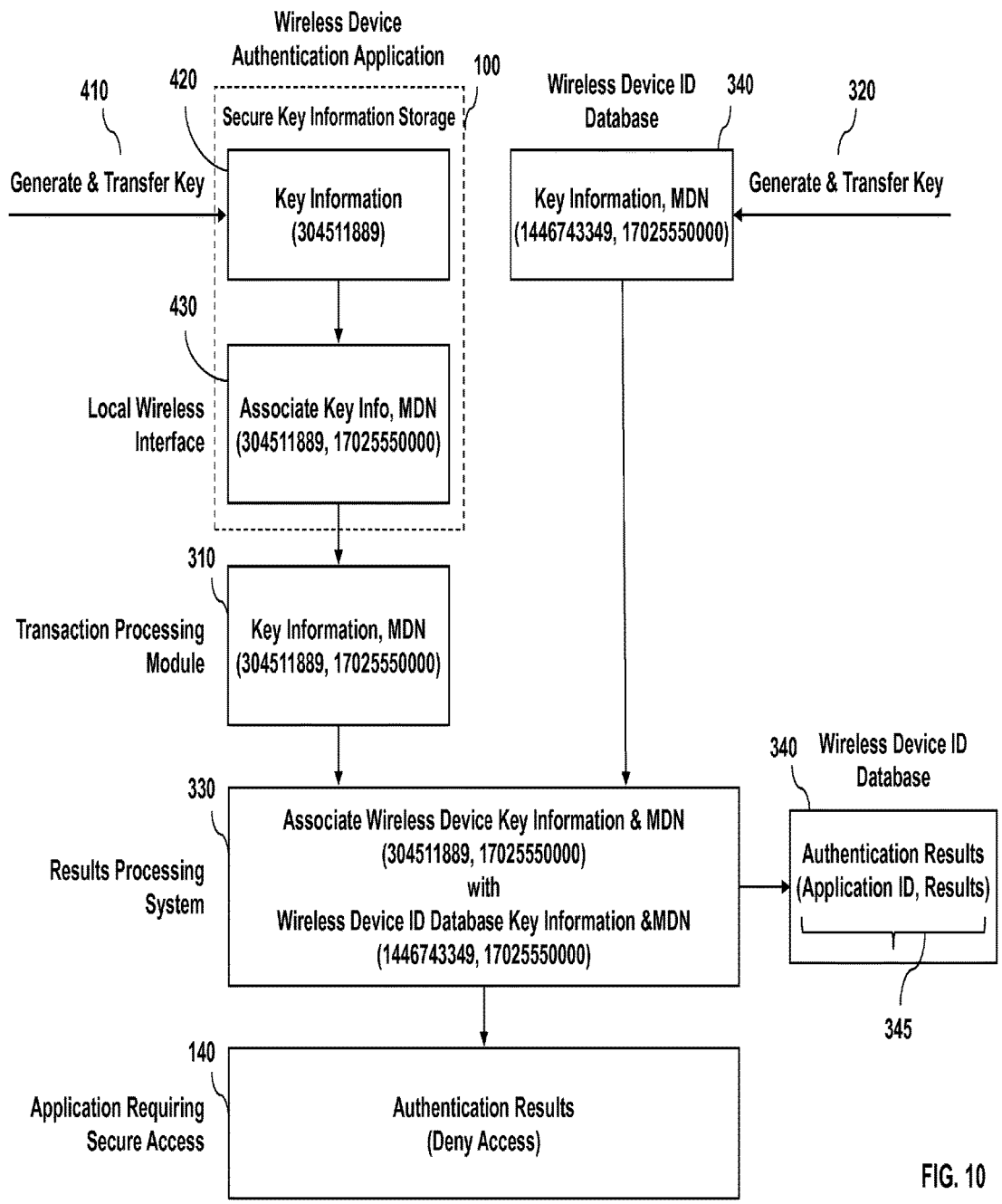
FIG. 10 depicts an exemplary process flow diagram of a Wireless Device Based User Authentication system resulting in an unsuccessful authentication process where access is denied.

FIG. 10 is an exemplary detailed process flow diagram representing the operation of a Wireless Device Based User Authentication system resulting in an unsuccessful Authentication Result. In this exemplary process flow, an entity or individual may initially invoke either manually or automatically some transaction or application access attempt resulting in an application access event that causes Wireless Device Based User Authentication to occur in accordance with the principles of the present invention. Authentication Key Information has been previously generated by Key Generation Logic and is transferred 410 to Secure Key Information Storage 420 associated with the Wireless Device Authentication Application. Alternatively, Authentication Key Information may be downloaded to, previously installed or otherwise transferred to the Wireless Device Authentication Application from some other computing device, platform or computer storage and stored in Secure Key Information Storage 420. In this exemplary case, the value of the Authentication Key Information is a ten-digit string of numbers "304511889." Authentication Key Information has been previously generated by Key Generation Logic and is transferred 320 to the Wireless Device ID Database 340 associated with the Authentication Application. Alternatively, Authentication Key Information may be downloaded to, previously installed or otherwise transferred to the Wireless Device ID Database from some other computing device, platform or computer storage and stored in the Wireless Device ID Database 340. In this exemplary case, the value of the Authentication Key Information is a ten-digit string of numbers "1446743349." In the Wireless Device Authentication Application, the Authentication Key Information "1446743349" is associated with the Wireless Device ID, in this exemplary case, the MDN value "17025550000" for the Local Wireless Interface 430. Similarly, the Authentication Key Information "1446743349" is associated with the Wireless Device ID, in this exemplary case, the MDN value "17025550000" in the Wireless Device ID Database 340. The Authentication Key Information and MDN of the Wireless Device and associated with the Wireless Device Authentication Application 400 are sent to the Transaction Processing Module 310 of the Authentication Application. The Authentication Key Information and MDN are sent from the Transaction Processing Module 310 to the Results Processing System 330. Similarly, the Authentication Key Information and MDN from the Wireless Device ID Database 340 and associated with the Authentication Application are sent to the Results Processing System 330 of the Authentication Application. The Results Processing System 330 associates the Authentication Key Information and MDN, in this case the values "304511889" and "17025550000," respectively, obtained from the Wireless Device Authentication Application 400, with the Authentication Key Information and MDN, in this case the values "1446743349" and "17025550000," respectively, obtained from the Wireless Device ID Database 340. The Results Processing System 330 generates an unsuccessful Authentication Result as the respective values for the Authentication Key Information parameters do not correspond, and in this exemplary case, do not match. The Results Processing System 330 then returns the Authentication Results to the Application Requiring Secure Access 140 enabling the Application Requiring Secure Access 140 to deny access to the user of the Wireless Device. The Results Processing System 330 also stores the Authentication Results 345 in the form of an Application ID and an unsuccessful Result to the Wireless Device ID Database of the Authentication Application.

Figure 11:
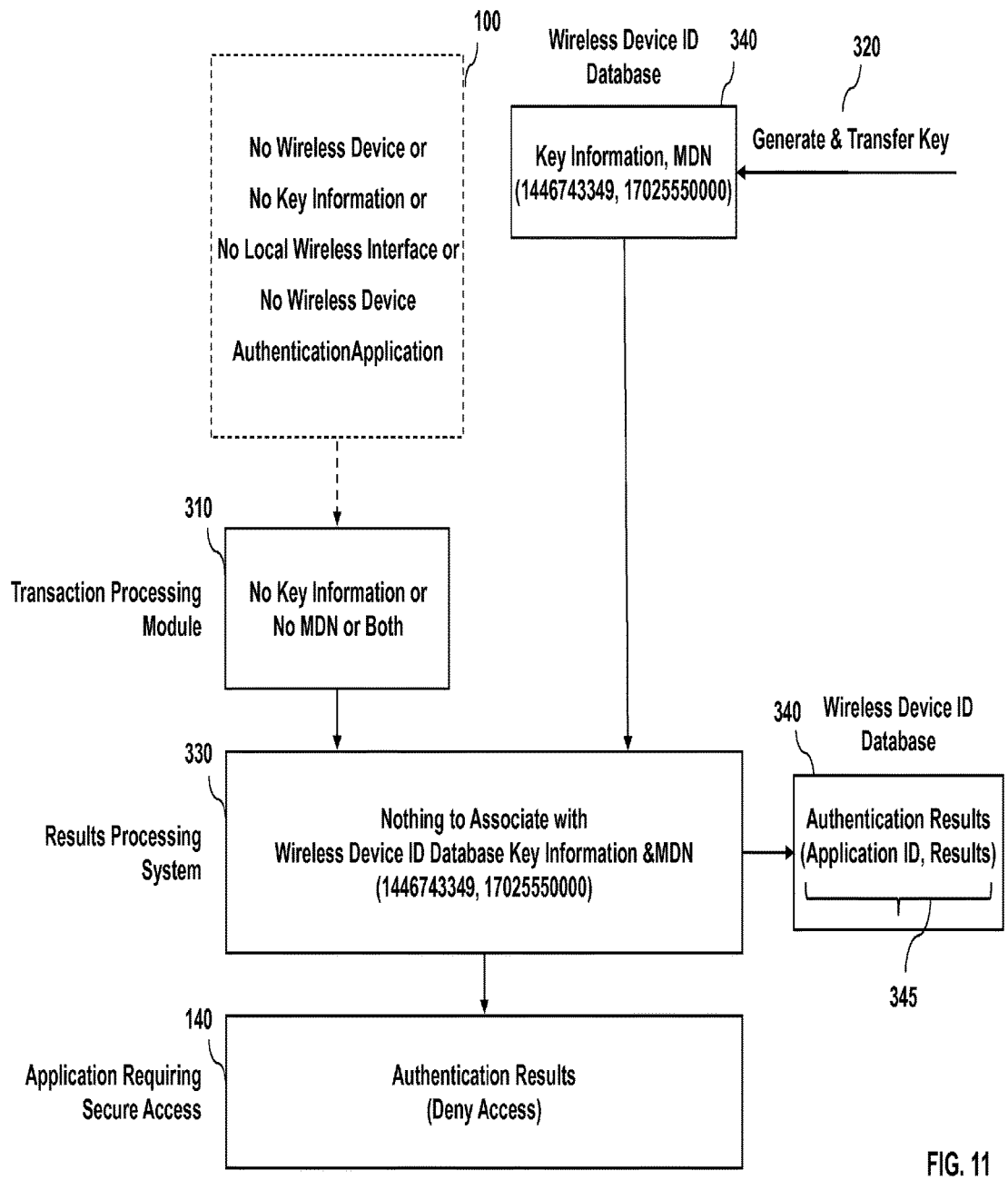
FIG. 11 depicts an exemplary process flow diagram of a Wireless Device Based User Authentication system resulting in an unsuccessful authentication process where access is denied due to the lack of presence of an enabled Wireless Device Authentication Application.

FIG. 11 is an exemplary detailed process flow diagram representing the operation of a Wireless Device Based User Authentication system resulting in an unsuccessful Authentication Result due to the lack of presence of a Wireless Device 100, or lack of presence of Wireless Device Key Information or lack of presence of a Wireless Device Authentication Application. In this exemplary process flow, an entity or individual may initially invoke either manually or automatically some transaction or application access attempt resulting in an application access event that causes Wireless Device Based User Authentication to occur in accordance with the principles of the present invention. Authentication Key Information has been previously generated by Key Generation Logic and is transferred 320 to the Wireless Device ID Database 340 associated with the Authentication Application. Alternatively, Authentication Key Information may be downloaded to, previously installed or otherwise transferred to the Wireless Device ID Database from some other computing device, platform or computer storage and stored in the Wireless Device ID Database 340. In this exemplary case, the value of the Authentication Key Information is a ten-digit string of numbers "1446743349." In this exemplary case, there is no Wireless Device 100, or if there is a Wireless Device 100, no Wireless Device Authentication Key Information exists or no Local Wireless Interface exists, or is detected, or no Wireless Device Authentication Application exists. Due to this circumstance, no Authentication Key Information and no Wireless Device ID (i.e. the MDN) is sent to the Authentication Application. The Authentication Key Information and MDN from the Wireless Device ID Database 340 and associated with the Authentication Application are sent to the Results Processing System 330 of the Authentication Application. The Results Processing System 330 attempts to associate the Authentication Key Information and MDN, in this case the values "1446743349" and "17025550000," respectively, obtained from the Authentication Application with the Authentication Key Information and MDN obtained from the Wireless Device Authentication Application. As this information does not exist, the Results Processing System 330 generates an unsuccessful Authentication Result as the respective values for the Authentication Key Information parameters do not correspond, and in this exemplary case, the information required from the Wireless Device does not exist. The Results Processing System 330 then returns the Authentication Results to the Application Requiring Secure Access 140 enabling the Application Requiring Secure Access 140 to deny access to the user of the Wireless Device. The Results Processing System 330 also stores the Authentication Results 345 in the form of an Application ID and an unsuccessful Result to the Wireless Device ID Database of the Authentication Application.

In accordance with the principles of the present invention, a Wireless Device Based User Authentication system has been provided. The system has utility for enhancing security of on-line websites and services, on-line purchases, on-line banking, on-line gaming, on-line media and content, on-line sharing of data, on-line interactive messaging systems, on-line social networking, on-line communications systems, an on-line user authentication service, user registration for an on-line service (e.g. as provided through client applications) or any computer software- or hardware-based service requiring secure access. The system may complement or supplant the use of usernames, passwords and other knowledge factors to authenticate users of computers, computer applications, networks, systems or devices. Furthermore, the present invention has utility providing a means of identity authentication for access or entry into residences, businesses, buildings, automobiles, garages, gates, computer applications, computer networks, computer devices or any automated or electronic system where secure access is desired or required.

The present invention provides multiple benefits. The use of a Wireless Device Based User Authentication system may significantly reduce incidents of identity theft and identity deception. The present invention provides robust identity authentication for any type of computer-based application access where security is a concern. It is desirable to have an automated system that enables individuals to use a single hardware token as a universal ownership authentication factor and the hardware device itself to be a commonly used device that individuals have with them at all times. Use of a Wireless Device Based User Authentication system as described in the present invention adds utility to a multiplicity of computer applications, networks and devices requiring secure user access and authentication.

While the invention has been described with reference to the exemplary embodiments thereof, those skilled in the art will be able to make various modifications to the described embodiments of the invention without departing from the true spirit and scope of the invention.

What is claimed is:

1. A method comprising:
   obtaining, by an authentication application associated with a mobile access point in response to an attempt to access an application requiring secure access, an authentication key from a wireless device, the authentication key being generated from key logic generation resources, and being associated with a wireless device identifier;
   obtaining, by the authentication application, a location of the wireless device;
   generating, by the authentication application, an authentication result based on at least the location of the wireless device, a time that the location of the wireless device was obtained, and the authentication key from the wireless device; and
   allowing access to the application requiring secure access based upon the authentication result.

2. The method of claim 1, wherein the mobile access point and the wireless device communicate using a short range communication mechanism comprising a Bluetooth protocol.

3. The method of claim 1, further comprising:
   obtaining, from the wireless device, a wireless device ID from the wireless device.

4. The method of claim 1, wherein the mobile access point is a personal computer.

5. The method of claim 1, wherein the application requiring secure access is on the mobile access point.

6. The method of claim 1, wherein the mobile access point authenticates the wireless device and wherein the application requiring secure access is in the mobile access point.

7. The method of claim 1, wherein the authentication application, which is separate from the mobile access point, authenticates the wireless device.

8. The method of claim 1, wherein the application requiring secure access is a social networking application.

9. The method of claim 1, wherein the authentication application is on an external platform accessible via the Internet, and is separate from the mobile access point.

10. The method of claim 1, wherein communications between the wireless device and the mobile access point are encrypted.

11. A system comprising:
    a processor; and
    a non-transitory computer readable medium comprising code, executable by the processor, for implementing a method comprising
    obtaining, by an authentication application associated with a mobile access point in response to an attempt to access an application requiring secure access, an authentication key from a wireless device, the authentication key being generated from key logic generation resources, and being associated with a wireless device identifier,
    obtaining, by the authentication application, a location of the wireless device,
    generating, by the authentication application, an authentication result based on at least the location of the wireless device, a time that the location of the wireless device was obtained, and the authentication key from the wireless device, and
    allowing access to the application based upon the authentication result.

12. The system of claim 11, wherein the wireless device and the mobile access point communicate via a short range communication mechanism comprising a Bluetooth protocol.

13. The system of claim 11, wherein the method further comprises:
    obtaining, from the wireless device, a wireless device ID from the wireless device.

14. The system of claim 11, wherein the mobile access point is a personal computer.

15. The system of claim 11, wherein application requiring secure access is on the mobile access point.

16. The system of claim 11, wherein the mobile access point authenticates the wireless device and wherein the application requiring secure access is in the mobile access point.

17. The system of claim 11, wherein the authentication application, which is separate from the mobile access point, authenticates the wireless device.

18. The system of claim 11, wherein the application requiring secure access is a social networking application.

19. The system of claim 11, wherein the authentication application is on an external platform accessible via the Internet, and is separate from the mobile access point.

20. The system of claim 11, wherein communications between the wireless device and the mobile access point are encrypted.

\* \* \* \* \*